United States Patent [19]

Kimura et al.

[11] Patent Number: 5,045,951

[45] Date of Patent: Sep. 3, 1991

[54] VIDEO SIGNAL PROCESSOR AND VIDEO SIGNAL PROCESSING METHOD FOR A VIDEO PRINTER

[75] Inventors: Hiroyuki Kimura, Kanagawa; Kentaro Hamma, Katsuta; Yasunori Kobori; Takashi Omata, both of Yokohama, all of Japan

[73] Assignee: Hitachi, Ltd., Tokyo, Japan

[21] Appl. No.: 400,940

[22] Filed: Aug. 31, 1989

[30] Foreign Application Priority Data

Sep. 2, 1988 [JP] Japan .................................. 63-219694

[51] Int. Cl.[5] ............................................. H04N 1/04
[52] U.S. Cl. .................................... 358/445; 358/443; 358/409
[58] Field of Search ................. 358/445, 138, 140, 75, 358/78, 409, 410, 411

[56] References Cited

U.S. PATENT DOCUMENTS

| | | | |
|---|---|---|---|
| 4,492,985 | 1/1985 | Sato et al. | 358/445 |
| 4,563,700 | 1/1986 | Sato | 358/445 |
| 4,796,095 | 1/1989 | Shimada | 358/409 |
| 4,833,445 | 5/1989 | Buchele | 358/138 |
| 4,912,564 | 3/1990 | Saitoh | 358/409 |

Primary Examiner—Joseph A. Orsino
Assistant Examiner—Thomas D. Lee
Attorney, Agent, or Firm—Antonelli, Terry, Stout & Kraus

[57] ABSTRACT

A video signal processing circuit for a video printer operating to sample an analog video signal, to convert the video signal into digital data, to store the data in a memory, and to read out the contents of memory to a printer for printing. The circuit includes an oscillation circuit which generates a pixel clock in response to the horizontal sync signal in the video signal, a frequency division phase shift circuit which divides the frequency of the pixel clock provided by the oscillation circuit and shifts the frequency divided clock with the pixel clock, a selection circuit which selects one of frequency divided clocks having different phases provided by the frequency division phase shift circuit, and a selection control circuit which operates on the selection circuit to alter the clock selection at each arrival of vertical sync signal, so that the sampling of the video signal is implemented in response to the clock output of the selection control circuit.

22 Claims, 18 Drawing Sheets (a) VIDEO SIGNAL
(b) PIXEL CLOCK
(c) FREQ. DIVIDER 53 OUTPUT
(d) FREQ. DIVIDED CLOCK $\phi_1$
(e) FREQ. DIVIDED CLOCK $\phi_2$
(f) FREQ. DIVIDED CLOCK $\phi_3$
(g) FREQ. DIVIDED CLOCK $\phi_4$

→ ROW ADDRESS

|   | 1 | 2 | 3 | 4 | 5 | 6 | 7 | 8 | 9 | 10 | 11 | 12 | 13 | 14 | 15 | 16 |
|---|---|---|---|---|---|---|---|---|---|----|----|----|----|----|----|----|
| 1 | 1 |   |   |   | 5 |   |   |   | 9 |    |    |    | 13 |    |    |    |
| 2 | 17 |  |   |   | 21|   |   |   | 25|    |    |    | 29 |    |    |    |
| 3 | 33 |  |   |   | 37|   |   |   | 41|    |    |    | :  |    |    |    |
| 4 | 49 |  |   |   | : |   |   |   | : |    |    |    |    |    |    |    |
| 5 | 65 |  |   |   | : |   |   |   | : |    |    |    |    |    |    |    |
| 6 | 81 |  |   |   | : |   |   |   | : |    |    |    |    |    |    |    |
| 7 | 97 |  |   |   |   |   |   |   |   |    |    |    |    |    |    |    |
|   | : |   |   |   |   |   |   |   |   |    |    |    |    |    |    |    |
|   | : |   |   |   |   |   |   |   |   |    |    |    |    |    |    |    |
| 16| 241| |   |   |245|   |   |   |249|    |    |    |253 |    |    |    |

COLUMN ADDRESS ↓

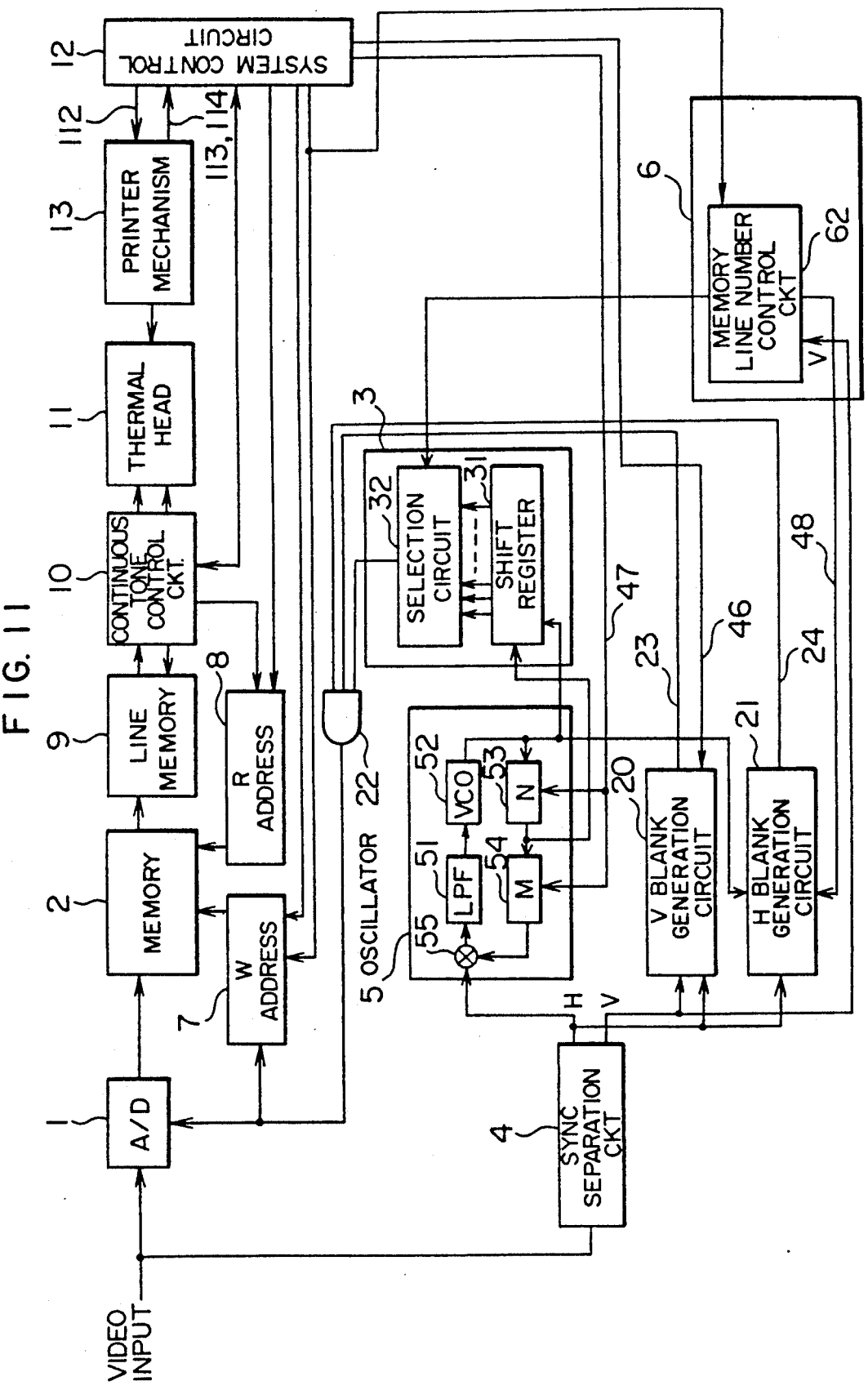

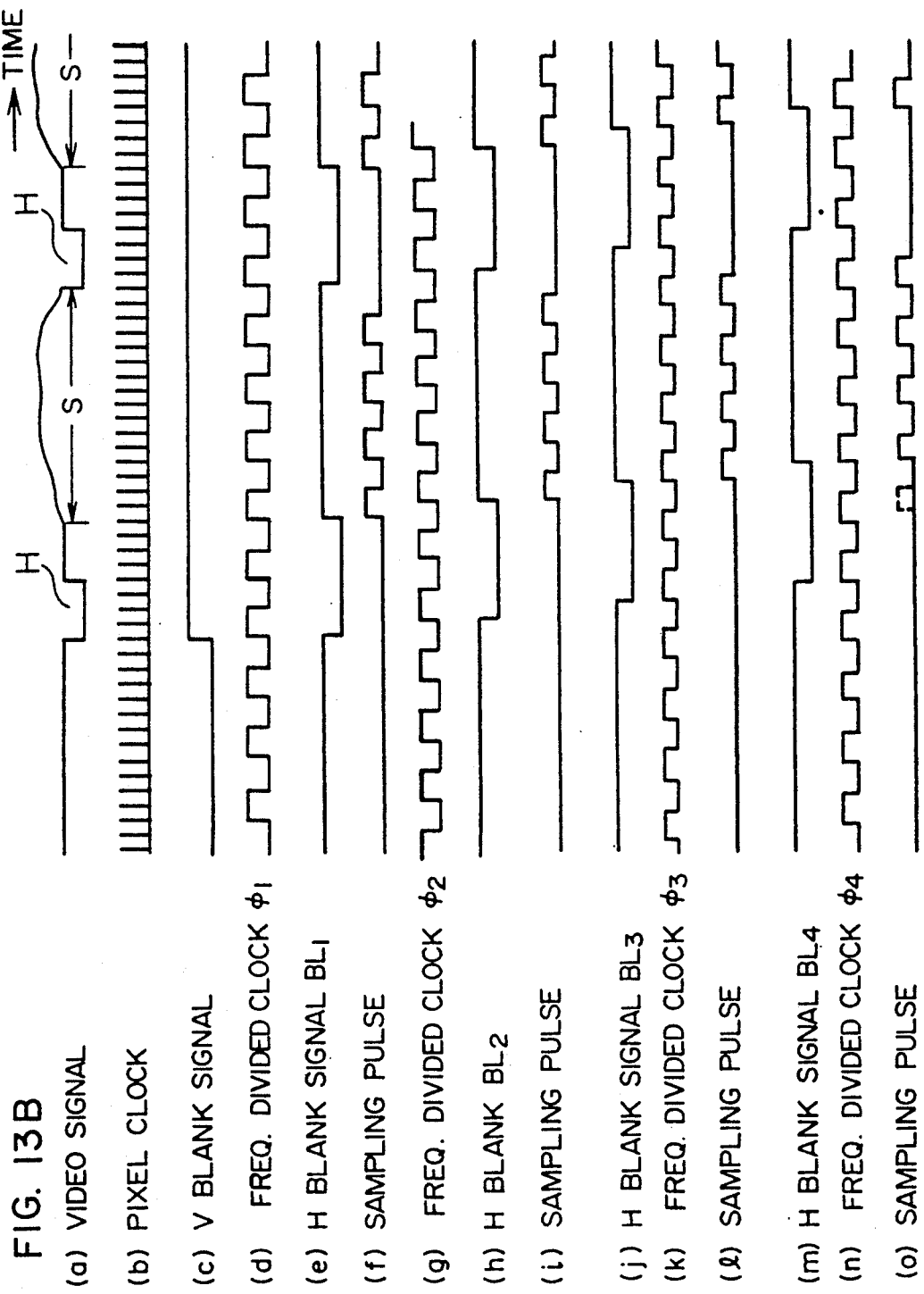

VIDEO SIGNAL PROCESSOR AND VIDEO SIGNAL PROCESSING METHOD FOR A VIDEO PRINTER

BACKGROUND OF THE INVENTION

This invention relates to a video printer which prints a screen image on a sheet of print paper, and particularly to a signal processor for a video printer having a sampling circuit which extracts print data from a video signal.

A conventional video printer has its sampling circuit designed to convert an analog video signal directly into digital data and store the data temporarily in a memory, and it reads the print data out of the memory for printing, as described in JPA No. 58-138667. Therefore, an input video signal at a higher frequency is stored in the memory at an increased data rate, accordingly. Namely, the conventional technique solely copes with an increased frequency of the video signal by speeding up the operation of the sampling circuit and memory.

On this account, the sampling circuit and memory are required to operate faster as the horizontal scanning frequency is raised. In the case of a high-resolution display in which the video signal has a horizontal scanning frequency of 64 kHz, for example, the video signal frequency reaches 100 MHz, at which frequency the A/D converter for the video signal and the associated sampling circuit including a write clock generator must operate. However, it is difficult to design such a fast sampling circuit, and the circuit will be complex and expensive.

SUMMARY OF THE INVENTION

This invention is intended to overcome the foregoing prior art deficiencies, and its prime object is to provide a video signal processor and video signal processing method for a video printer capable of sampling a high-frequency video signal without raising the operating speed of the sampling circuit.

In order to achieve the above objective, the present invention resides in a video signal processor for a video printer operating to sample an analog video signal, to convert the video signal into digital data, to store the data in a memory, and to read out the contents of memory to a printer for printing, wherein the processor comprises an oscillation circuit which oscillates and generates a pixel clock in synchronism with the horizontal sync signal in the video signal, a frequency division/phase shift circuit which divides the frequency of the pixel clock provided by the oscillation circuit and shifts the frequency divided clock with the pixel clock, a selection circuit which selects one of frequency divided clocks having different phases provided by the frequency division/phase shift circuit, and a selection control circuit which operates on the selection circuit to alter the clock selection at each arrival of a vertical sync signal, so that the sampling of the video signal is implemented in response to the clock output of the selection control circuit. The frequency division/phase shift circuit may include an independent frequency divider for the frequency division, or more preferably it may use part of a frequency divider in the oscillation circuit.

Frequency divided clocks out of phase by 1-pixel clock period with each other are produced, and frequency divided clocks different for each frame of picture are used to sample all pixel data of a screen image. The A/D converter operates at a divided clock frequency, and its operating speed is lowered by the frequency divided clock frequency divided by the pixel clock frequency and is capable of dealing with a high-frequency video signal without the need of speeding up the whole circuit. For example, when the horizontal scanning frequency is 64 kHz and the pixel clock is frequency divided by ¼, the A/D converter operates as slow as 25 MHz, and consequently the circuit arrangement is simplified and less expensive as compared with the conventional circuit arrangement. It is also possible, by using an A/D converter of the same speed as of the conventional circuit arrangement (frequency division by 1/n), to deal with video signals fast an n-fold of the conventional case.

Generally, a display unit provides a video signal by reading pixel data at a clock frequency m times the horizontal sync frequency, and the oscillation circuit in a printer generates a pixel clock in response to the horizontal sync signal. Conventionally, the pixel clock is used directly as a sampling clock of the A/D converter, whereas according to this invention the video signal is sampled not at a pixel-wise interval, but at a certain longer interval (e.g., at every N pixel). The pixel clock provided by the oscillation circuit is frequency divided to produce a sampling clock. For reading all pixels of a screen image, the sampling point is shifted at each arrival of a vertical sync signal. For this operation, N kinds of frequency divided clocks each shifted by 1-pixel clock period from each other are prepared, and a different kind of frequency divided clock is selected at each arrival of the vertical sync signal. Consequently, the A/D converter and memory are not required to have a high operating speed for reading all pixels.

For storing pixels in the memory, write addresses are generated in the order of sampled pixels, and for printing the image, read addresses are generated in a printer-dependent manner, e.g., in the order from left to right for each line, independently of the order of writing. Alternatively, write addresses may be generated at writing in consideration of phase shift, so that the memory is read out in the order of address.

In the case of high-resolution display with a horizontal sync frequency of 64 kHz, there are 1280 (horizontal) by 1024 (vertical) pixels. Lateral pixel-wise sampling will need a sampling frequency of about 100 MHz, as mentioned previously, whereas sampling at a 32-pixel interval, for example, needs only about 3 MHz for sampling 40 pixels in one horizontal period. Each sampling operation (for one frame) takes place by shifting the sampling start point by one pixel, and the whole screen image is introduced to the memory in a total of 32 sampling operations. In this manner, the operating speed required of the sampling circuit can be lowered.

An alternative scheme is that a recording area for the video signal is set up and a circuit is arranged to produce a signal indicative of whether or not pixels corresponding to the pixel clock are present in the recording area, so that the sampling of pixels is carried out in accordance with the result of a logical product between the output of this circuit and the output of the aforementioned selection circuit. In this case, the selection control circuit is preferably capable of adding an offset value to the output depending on the setup of the recording area.

The memory is designed to store pixel data of the video signal for a complete screen image, or it may be designed to store only part of a screen image. In the

BRIEF DESCRIPTION OF THE DRAWINGS

FIG. 3A is a diagram showing the arrangement of pixels in the video signal;

FIGS. 3B-3D are diagrams explaining, as examples, the order of writing and reading pixel data in the memory;

FIG. 11 is a block diagram showing the second embodiment of this invention;

FIGS. 13A and 13B are timing charts showing the waveform of the horizontal and vertical blank signals;

DESCRIPTION OF THE PREFERRED EMBODIMENTS

The inventive video signal processor for a video printer will be described for the illustrated embodiments. Although the following embodiments of the invention are applied to a thermal transfer printer, the present invention is equally applicable to printers of other known types, e.g., ink-jet printers, etc.

Figure 1:
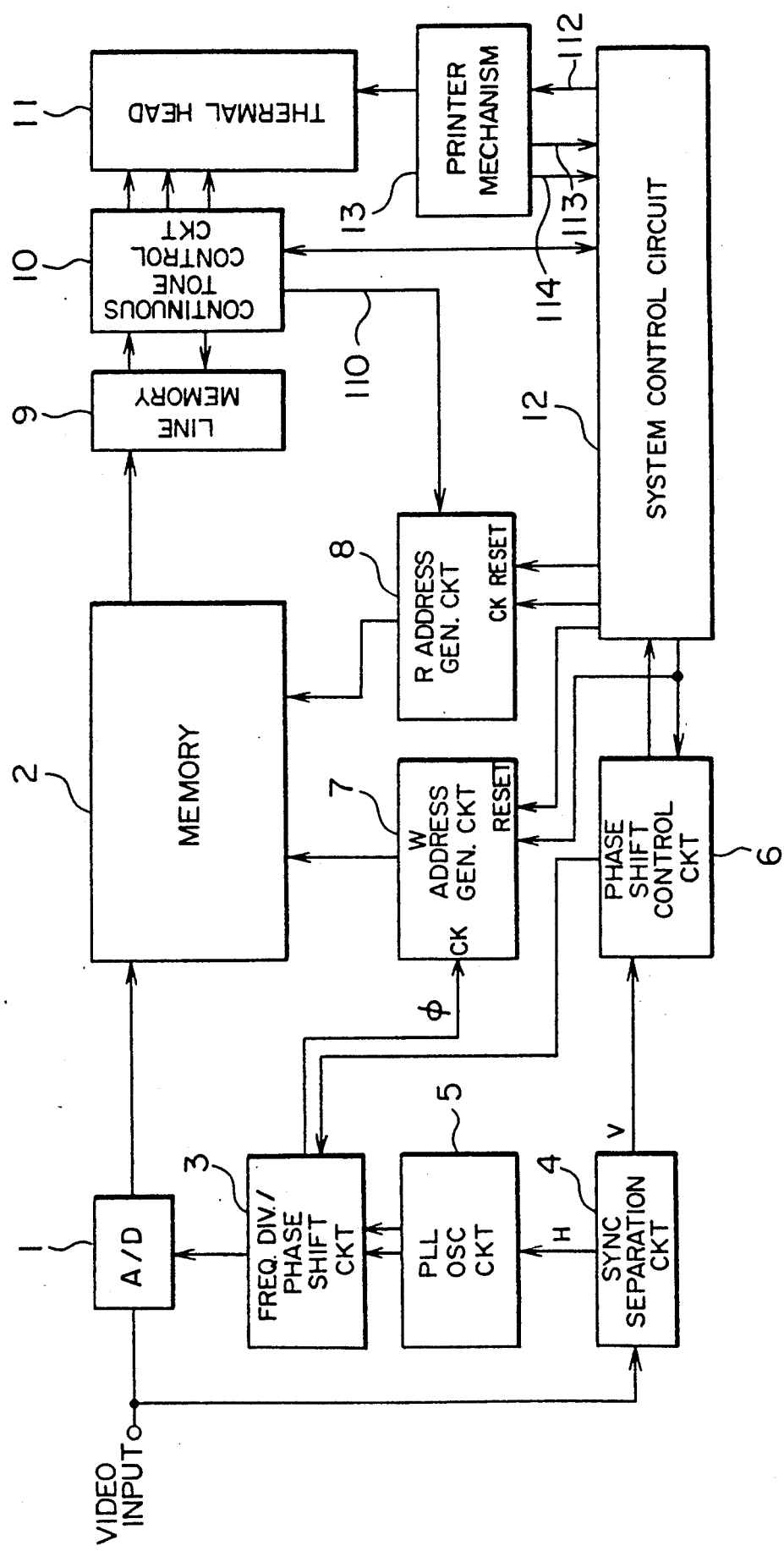
FIG. 1 is a block diagram showing a first embodiment of the video signal processor for a video printer according to this invention.

FIG. 1 shows in block diagram the first embodiment of this invention. In the figure, indicated by 1 is an A/D conversion circuit which samples an analog video signal and converts it into digital data, 2 is a memory which stores the video data, 3 is a frequency division/phase shift circuit which produces a sampling clock for the A/D conversion circuit, 4 is a sync separation circuit which separates the horizontal and vertical sync signals from the video signal, 5 is a PLL oscillation circuit which uses the horizontal sync signal provided by the sync separation circuit 4 as a reference signal, 6 is a phase shift control circuit which controls the memory 2 for its write operation and the frequency division/phase shift circuit 3, 7 is a write address generation circuit which generates the write address for the memory 2, 8 is a read address generation circuit which generates the read address for the memory 2, 9 is a line memory which stores data to be printed on one line, 10 is a continuous tone control circuit which produces control data for controlling the printer thermal head on the basis of data read out of the line memory 9, 11 is a thermal head which generates heat in proportion to the tone of the image so that ink is transferred to the print paper, 12 is a system control circuit which performs the print control and the like for the printer section, and 13 is a printer mechanism in the printer section. The printer section is a part of the system including the continuous tone control circuit 10, thermal head 11 and printer mechanism 13. In FIG. 1, portions excluding the printer section and memories 2 and 9 constitute a video signal processor.

Figure 2A:
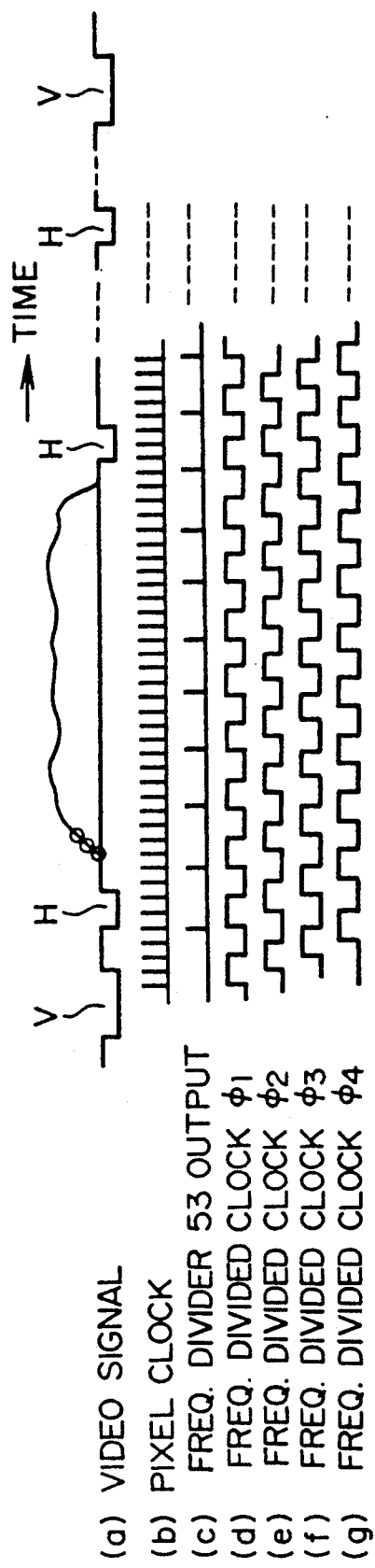
FIG. 2A is a timing chart showing phase shifts of the sampling clocks.
Figure 2B:
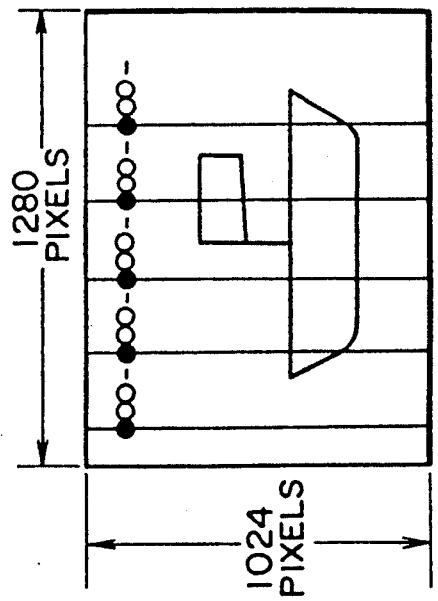
FIG. 2B is a timing chart showing the sampling operation for pixels of a screen image to be printed.
Figure 3C:
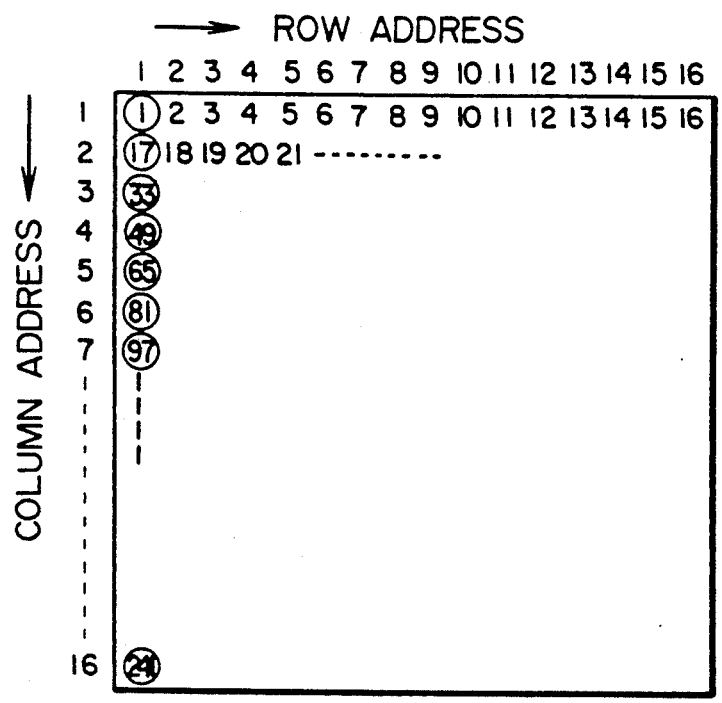

FIG. 2A is a timing chart showing the video signal and sampling clock which is provided by the frequency division/phase shift circuit 3 for the A/D conversion circuit 1, and FIG. 2B is a diagram showing the sampling operation for pixels of image to be printed. FIG. 3A is a diagram showing the arrangement of pixels in the video signal to be printed, and FIGS. 3B and 3C are diagrams used to explain as examples the order of writing and reading pixel data in the memory 2.

Figure 4:
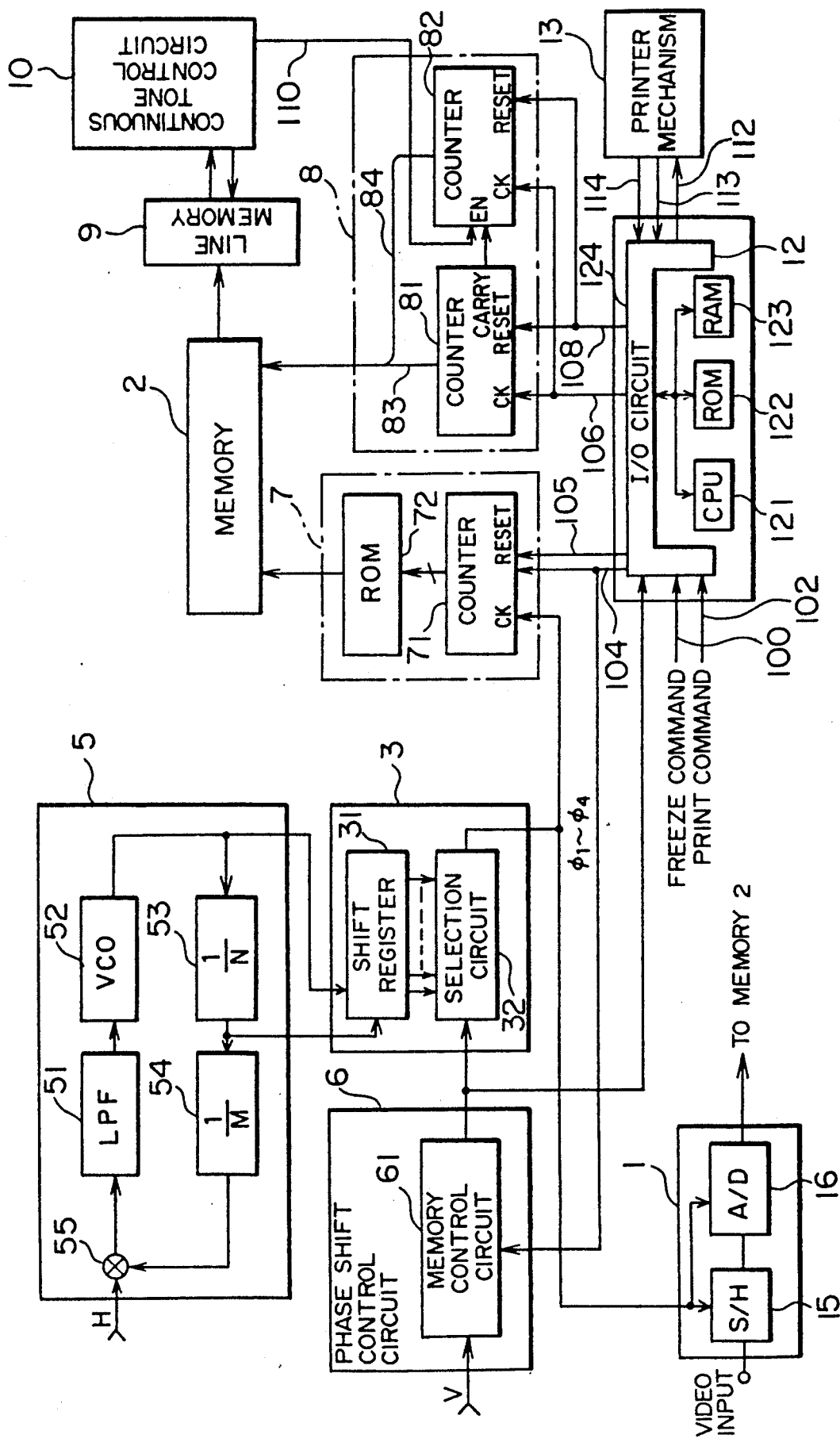
FIG. 4 is a detailed block diagram of the video signal processor shown in FIG. 1.

FIG. 4 is a detailed block diagram of the video signal processor shown in FIG. 1. In the figure, the A/D conversion circuit 1 includes a fast sample-holding (S/H) circuit 15 and a slow A/D converter 16. The frequency division/phase shift circuit 3 includes a shift register 31 which performs a phase shift for frequency divided pulses in accordance with the pixel clock provided by the PLL oscillator 5, and a phase shift selection circuit 32 which selects one of frequency divider pulses $\Phi_1$-$\Phi_N$ having different phases provided by the shift register 31. An oscillator 5 generates pixel clocks in synchronism with the horizontal sync signal. The oscillator 5 is preferably a PLL oscillator. The PLL oscillator 5 includes a low-pass filter (LPF) 51 which filters the output signal of a phase comparator 55, a voltage-controlled oscillator (VCO) 52 which generates the pixel clock in accordance with the output signal of the LPF 51, a frequency divider 53 which frequency divides the pixel clock by 1/N (where N is an integer not less than 2, e.g., 4), a frequency divider 54 which further divides the pixel clock from the frequency divider 53 by 1/M (where M is an integer, e.g. 8), and a phase comparator 55 which compares the phase of the clock output from the frequency divider 54 and the phase of the horizontal sync signal H to produce an error signal which is proportional to the phase difference of these signals. The pixel reading frequency is generally M×N times the horizontal sync frequency, and this factor is 32 in this embodiment. The shift register 31 produces, from the clock output of the frequency divider 53, multiple (N, e.g., four) frequency divided clocks $\Phi_1$-$\Phi_4$ with their phase being shifted by 1-pixel clock period from each other as shown by (d)-(g) in FIG. 2A.

The phase shift control circuit 6 includes a memory line number control circuit 61 which is a counter for counting the number of vertical sync signals and reset each reception of N vertical sync signals. The count value is imparted to the selection circuit 32 and system control circuit 12. Accordingly, the selection circuit 32 selects one of frequency divided clocks $\Phi_1$-$\Phi_4$ from the shift register 31 in accordance with the count value of the counter 61, and delivers it as a sampling clock to the A/D conversion circuit 1 and write address generation circuit 7.

The write address generation circuit 7 includes a counter 71 which counts the frequency divided clocks $\Phi_1$-$\Phi_4$, and a read-only memory (ROM) 72 which releases a write address in response to a count value from the counter 71. The read address generation circuit 8 includes a counter 81 which counts the clock from the system control circuit 12 to produce a row address of the memory, and a counter 82 which counts the clock from the system control circuit in response to the carry signal from the counter 81 to produce a column address of the memory.

The system control circuit 12 includes a central processing unit (CPU) 121, a read-only memory (ROM) 122, a random access memory (RAM) 123, and an input-/output (I/O) circuit 124.

In the A/D conversion circuit 1, the sample-holding circuit 15 samples and holds the video signal in response to the sampling clocks $\Phi_1$-$\Phi_4$ and the A/D converter 16 converts the held video signals into digital data. Accordingly, the A/D conversion circuit operates on the basis of the frequency divided clocks $\Phi_1$-$\Phi_4$, and the A/D converter 16 does not need to operate as fast as the pixel clock frequency.

Although in this embodiment the frequency division circuit is formed of two frequency dividers 53 and 54, it may be formed of a single frequency divider (reducing the pixel clock by $1/(N \times M)$), with a $1/N$ frequency divided clock at its intermediate stage being fed to the shift register 31. The frequency dividers 53 and 54 have their frequency division factors set arbitrarily by a command sent from the system control circuit 12 over a signal line (not shown).

Next, the write operation and read operation of the memory for the video signal according to this embodiment will be explained in brief. Although the following describes the case of a monochrome screen image formed of a single frame, the embodiment is readily applicable to the case of a color image or the case of a screen image formed of multiple frames.

As shown in FIG. 2A, the input video signal is sampled for the first frame at the rising edge of the frequency divided clock $\Phi_1$. The frequency divided clock $\Phi_1$ is selected because of count value "1" for the vertical sync signal provided by the counter 61. After the video signal for one frame has been sampled, the counter 61 up-counts the vertical sync signal to produce count value "2", which replaces the frequency divided clock $\Phi_1$ with $\Phi_2$, so that the second frame (same image as the first frame) is sampled at the rising edge of the frequency divided clock $\Phi_2$. In this manner, the sampling operation is repeated for each frame in response to the frequency divided clocks from $\Phi_1$ to $\Phi_N$ (where N is equal to 4 in this embodiment), and all pixel data are introduced to the memory 2 in the lateral direction on the screen. The video signal is sampled at every four pixels in each frame as shown in FIG. 2B. The operation will further be explained with reference to FIGS. 3A and 3B. FIG. 3A shows the arrangement of pixels in the video signal. In the case of high-resolution display to which this invention is applied, the horizontal sync frequency is 64 kHz and pixels are arranged in a 1280 (horizontal) by 1024 (vertical) matrix, for example. However, the following description of embodiments is based on the assumption that the matrix is 16 by 16 pixels in the horizontal and vertical scanning directions, respectively, for the simplicity of explanation. Since N is equal to 4 in this embodiment, sampling by the frequency divided clock $\Phi_1$ takes place in the order of pixels 1, 5, 9 and 13 on the first horizontal scanning line. Sampling for one scanning line is followed by the next horizontal line in the order of pixels 17, 21, 25 and 29. In this manner, all pixels of the first frame are introduced to the memory, whose memory map results as shown in FIG. 3B. Similarly, sampling for the next frame takes place in response to the frequency divided clock $\Phi_2$ in the order of pixels from 2, 6, 10, 14, 18, 22 and so on, and the memory 2 has its memory map at the end of the fourth frame sampling as shown in FIG. 3C.

The memory 2 is read out to the printer in such a manner that a column of pixel data at column address 1 (enclosed in circles in FIG. 3C) is read out and printed, and next a column of pixel data at column address 2 is read out and printed. An alternative scheme is that a row of pixel data is read out at a time and then printed.

Next, the write operation of the memory 2 for video data according to this invention will be described with reference to the flowchart of FIG. 5 and the block diagram of FIG. 4. The system control circuit 12 operates in accordance with the program stored in the ROM 122.

Initially, a freeze command for storing the image data in the memory 2 is entered over a line 100 to the I/O circuit of the system control circuit 12 (step 102). The control circuit 12 issues a freeze trigger to the reset terminal of the counter 61 of the phase shift control circuit 6 over a line 104 so as to clear the counter 61 (step 104). The freeze trigger is also applied to the reset terminal of the counter 71 so that it is cleared. The selection circuit 32 is initialized when the counter 61 is cleared (step 106).

The video signal is entered to the A/D conversion circuit 1 of the sync separation circuit 4. The PLL oscillator 5 operates and the shift register 31 produces the multiple frequency divided clocks $\Phi_1$-$\Phi_4$. On receiving the first vertical sync signal of the first frame of the video signal after the counter 61 has been cleared, the counter 61 up-counts to "1", causing the selection circuit 32 to deliver the frequency divided clock $\Phi_1$ (shown by (d) in FIG. 2A) selectively (step 108). The A/D conversion circuit 1 responds to the clock $\Phi_1$ to commence the sampling and A/D conversion for the image signal, and sends the image data to the memory 2.

The write address generation circuit 7 operates on its counter 71 to count the clock $\Phi_1$, and the ROM 72 releases write addresses 1.1, 1.5, 1.9, 1.13, 2.1 and so on as the count value advances 1, 2, 3, 4, 5 and so on. Each pair of addresses punctuated by a period "." represents a pair of row and column addresses of the memory. Consequently, the memory stores pixels 1, 5, 9, 13, 17 and so on in locations of addresses 1.1, 1.5, 1.9, 1.13, 2.1 and so on as shown in FIG. 3B. The ROM 72 is written in advance to have the write addresses of memory 2 in relation to count values the counter 71.

After the image data of the first frame has been stored in the memory, the counter 61 advances to "2" in response to the vertical sync signal, and the selection circuit 32 delivers the clock $\Phi_2$ in place of $\Phi_1$. Then, the A/D conversion circuit 1 samples pixels 2, 6, 10 and so on sequentially. At a time point when the memory 2 has stored pixels 1–253 of the first frame, the counter 2 has a count value of 64, and it advances to "65" on receiving the first clock $\Phi_2$, which causes the ROM 72 to release address 1.2. Consequently, pixels 2, 6, 10, 14, 18 and so on of the second frame are stored in locations of addresses 1.2, 1.6, 1.10, 1.14, 2.2 and so on.

Figure 6:
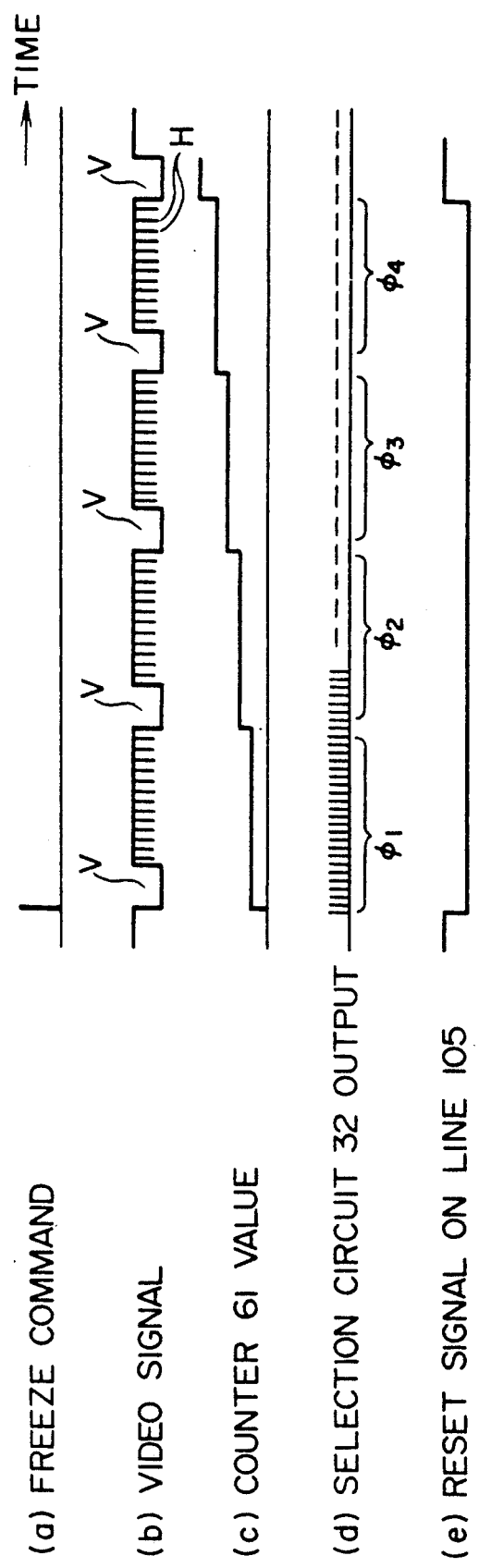
FIG. 6 is a timing chart showing the principal signals related to the memory write operation according to the first embodiment of this invention.

In this manner, after the write operation up to the fourth frame has completed storage of all pixel data for a screen image, the counter 61 reaches count value "5", and it is delivered to the system control circuit 12. The control circuit 12 thereafter supplies the reset signal continuously to the counter 71 in the address generation circuit 7 over a line 105 (step 112). The reset signal lasts until the entry of the next freeze command, and the circuit 7 does not produce a write address until then. FIG. 6 shows on a timing chart the principal signals related to the write operation.

Next, the read operation of the memory 2 for the image data and the successive print operation will be described with reference to FIGS. 7 and 8. FIG. 8 is a timing chart explaining the operation of the read address generation circuit 8, control circuit 12, etc.

Initially, a print command is entered to the system control circuit 12 over the line 102 (step 120). The control circuit 12 issues a reset signal to the counters 81 and 82 over a line 108 so that their count values are reset to 0 and 1. The control circuit 12 issues a reset signal to the continuous tone control circuit 10 over a line 110 so that it is reset, and issues an initialization signal to the printer mechanism 13 over a line 112 so that it is initialized (step 122). The initialization of the printer mechanism is to feed a sheet of print paper to the position of the thermal head. The initialized printer mechanism 13 returns an initialization end signal to the control circuit 12 over a line 113. In response to this signal, the control circuit 12 issues a line print command (shown by (e) in FIG. 8) to the printer mechanism 13, and the printer mechanism is driven at the print speed. At the issuance of the line print command, the control circuit 12 supplies 16 clocks (shown by (b) in FIG. 8) to the counters 81 and 82 over a line 106. The counter 81 generates column address 1–16 of the memory 2 sequentially while it counts clocks from 1 to 16. The counter 82 also receives the clocks, but it does not receive a carry signal on its enable terminal from the counter 81 and it delivers "1" as a row address. Consequently, the memory is given addresses 1.1, 2.1, 3.1, 4.12, ... , 16.1 sequentially, and pixels 1, 17, 33, ... , 49, ... , 241 are read out sequentially into the line memory 9. After that, the intermediate tone control circuit 10 reads out the line memory and, after converting the pixels into thermal head drive signals, supplies the signals to the thermal head 11 for printing. After pixel data for one line has been printed, the continuous tone control circuit 10 issues a high-level signal (shown by (g) in FIG. 8) to the enable terminal of the counter 82 over the line 110. When the counter 81 reaches a count value 16, it sends a carry signal to the enable terminal of the counter 82. Receiving the carry signal on the enable terminal and the high-level signal on the line 110, the counter 82 is ready to count the clock. In this state, when the printer mechanism 13 feeds the paper for one line and returns a feed pulse (shown by (a) in FIG. 8), the control circuit 12 issues a line print command and delivers 16 clocks. Among the 16 consecutive clocks, the first clock is generated when the signal on the line 110 and the carry signal are high, causing the first clock to be counted by the counter 82, which then up-counts to "2" as a row address. Consequently, pixel data of the next column is read out and printed. When the counter 82 reaches "16" and all the pixel data of a screen image are read out and printed, the system control circuit 12 issues an end signal to the printer mechanism 13 so that it is initialized, and also to the reset terminal of the address generation circuit 8 so that the counters 81 and 82 are cleared (step 128).

Figure 3D:
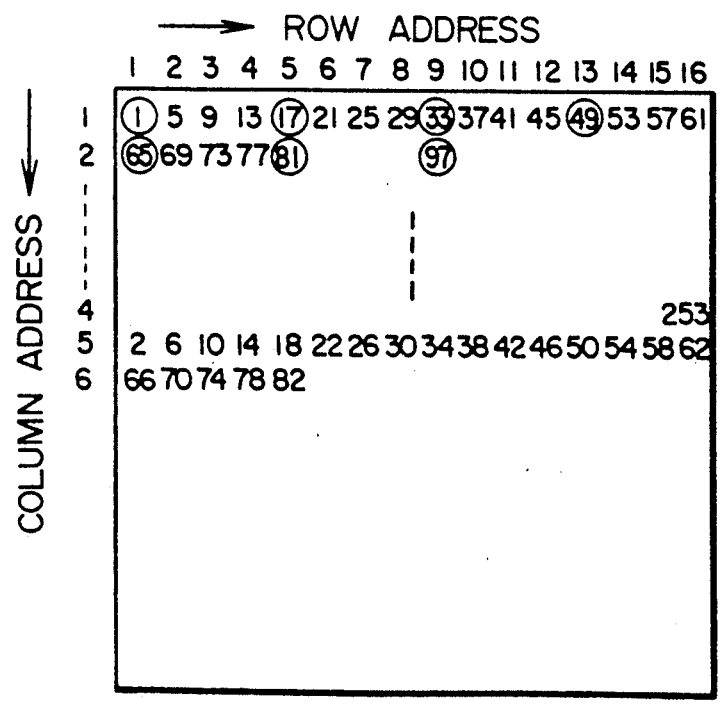

Although in the above embodiment stepping addresses are generated by the write address generation circuit 7, an alternative scheme is to generate continuous write addresses and generate stepping addresses by the read address generation circuit 8. For example, as shown in FIG. 3D, pixels 1, 5, 9 and 13 are stored sequentially in addresses 1.1, 1.2, 1.3 and 1.4 in response to the frequency divided clock $\Phi_1$ and pixels 2, 6, 10 and 14 are stored sequentially in addresses 5.1, 5.2, 5.3 and 5.4 in response to the frequency divided clock $\Phi_2$, and for printing the stepping addresses are generated to read out pixels 1, 17, 33 and 49 sequentially.

Although in the above embodiment the A/D converter 12 is used to store the input video signal in the memory 2, it may be replaced with a latch circuit or comparator in case of dealing with multi-color signals (R, G and B signals, each being 1 or 0 for producing eight colors).

Figure 9:
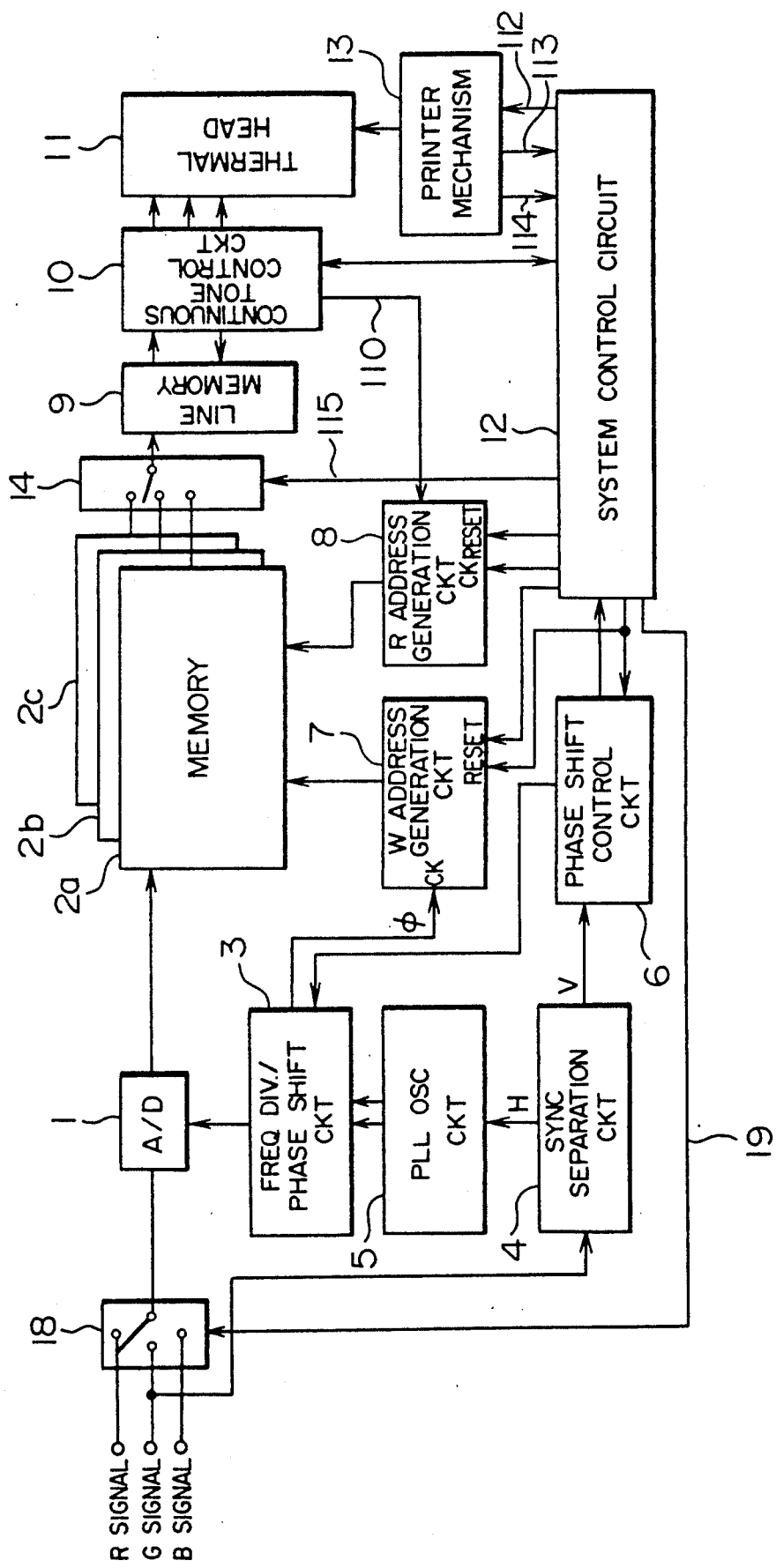
FIG. 9 is a block diagram showing a second embodiment of this invention capable of printing multi-color images.

FIG. 9 shows the second embodiment of this invention which is modified from the first embodiment for printing multi-color images. In this embodiment, the incoming R, G and B signals are conducted sequentially to the A/D conversion circuit 1 through a selector 18 which is controlled by a control signal from the system control circuit 12. The R, G and B data are stored in three memories 2a, 2b and 2c, each being identical to the memory 2 in the first embodiment. One of the input signals, e.g., G signal, is applied to the sync separation circuit 4. Provided between the memorys 2a–2c and line memory 9 in an output selector 14, which conducts one of outputs of the memories to the line memory 9 by selecting it using a switching signal sent from the system control circuit 12 over a line 115. For printing, video data in the memory 2a is read out first so that red pixels for an entire picture is printed, which is followed by printing of green pixels and finally blue pixels.

Figure 10:
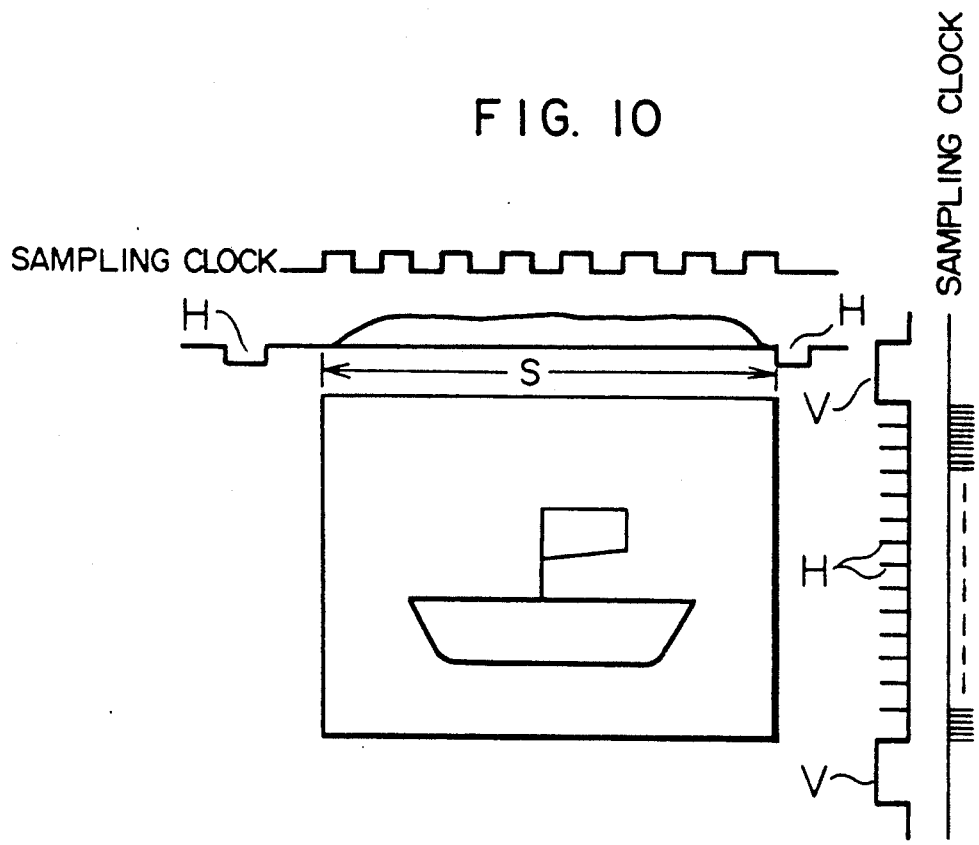
FIG. 10 is a diagram used to explain the blanking operation according to the second embodiment of this invention.

Next, the third embodiment of this invention will be described. As opposed to the first embodiment in which the sampling operation continues even during the horizontal and vertical blanking periods as shown in FIG. 2A, the third embodiment is intended to quit sampling in these periods when the video signal is absent. The sampling clock $\Phi$ is supplied to the A/D conversion circuit 1 only during a period when video data exist, as shown in FIG. 10.

FIG. 11 shows the arrangement of this embodiment, in which functional blocks identical to those of FIG. 1 are referred to by the common symbols. This embodiment differs from the first embodiment in the arrangement of the phase shift control circuit 6 and in the additional provision of a V blank generation circuit 20, a H blank generation circuit 21 and an AND gate 22. The following explains only these different portions. A line 47 is provided to send a command signal for setting demultiplication factors for the demultipliers 53 and 54.

In the figure, indicated by 20 is a V (vertical) blank generation circuit which indicates the video signal record region in the screen vertical domain, 21 is a H (horizontal) blank generation circuit which indicates the video signal record region S in the horizontal domain, and 22 is a gate circuit which passes the sampling clock selected by the selection circuit 32 only during the signal regions. Indicated by 62 is a memory line number control circuit similar to that provided in the phase sift control circuit 6 of FIG. 1, and it operates on the selection circuit 32 to alter the order of selection for the frequency divided clocks $\Phi_1$-$\Phi_4$ in response to the entry of an offset value and also controls the width of blank of the H blank generation circuit 21.

Figure 13A:
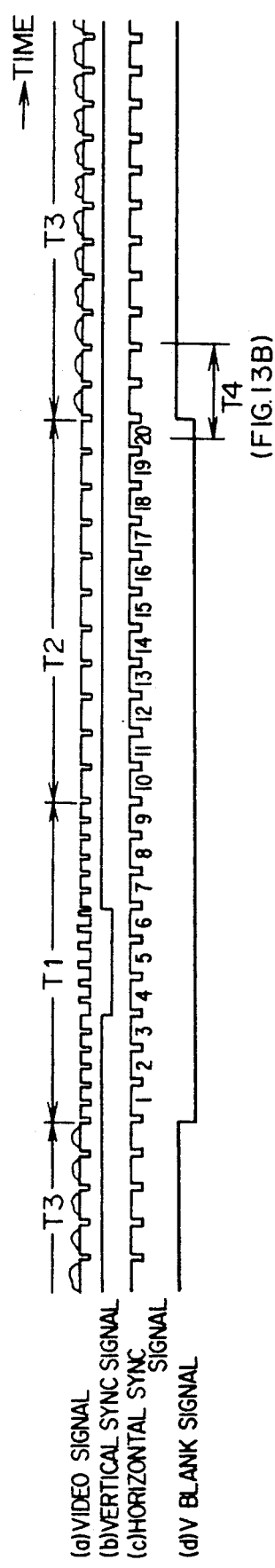

FIGS. 13A and 13B are timing charts showing the waveforms of the H blank signal, V blank signal and sampling clock for the explanation of operation of this embodiment. The following describes the operation of this embodiment with reference to these figures.

Figure 12:
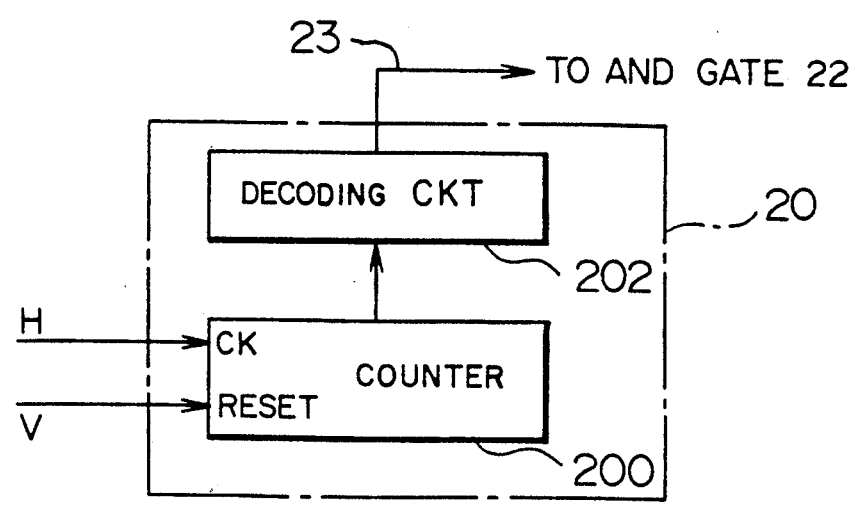
FIG. 12 is a block diagram of the vertical blank generation circuit in FIG. 11.

The V blank generation circuit 20 and H blank generation circuit 21 receive the output of the sync separation circuit 4 to produce gate signals which pass the sampling signal only during periods of record in the vertical and horizontal directions on the screen. The V blank generation circuit 20 uses the sync signal separated by the sync separation circuit 4 to produce a gate signal which passes frequency divided clocks from the selection circuit 32 only for the signal recorded region in the vertical period. The circuit can readily be configured by means of a counter 200 which is cleared by the V signal and counts the horizontal sync signal H and a decoding circuit 202 which decodes the output of the counter, as shown in FIG. 12.

The video signal is generally made up of a sync segment $T_1$, a video segment $T_2$ where no video signal is recorded, and a video segment $T_3$ where a video signal is recorded, as shown by (a) in FIG. 13. Therefore, the V blank signal preferably goes low in the segments $T_1$ and $T_2$ as shown by (d) in FIG. 13.

The decoding circuit is designed such that it delivers a low output when the counter 200 is cleared and restores a high output when the count of the horizontal sync signal reaches "20" for example, as shown by (d) in FIG. 13. The H blank generation circuit 21 produces a H blank signal which gates the signal record region S. The operation of the H blank generation circuit 21 will be explained on the timing chart of FIG. 13B, which shows in detail the segment $T_4$ in FIG. 13A. In this embodiment, the frequency divided clocks $\Phi_1$-$\Phi_4$ are passed as sampling clocks to the A/D conversion circuit only when both of the V blank signal and H blank signal are high.

It is necessary for the H blank generation circuit 21 to have its output shifted in the same fashion as shifting phases of sampling clocks $\Phi_1$-$\Phi_4$ provided by the selection circuit 32. Otherwise, if, as shown in FIG. 13B, the H blank signal for the clock $\Phi_4$ (shown by (n) in FIG. 13) is coincident with a H blank signal (shown by (e) in FIG. 13B) for the clock $\Phi_1$ (shown by (d) in FIG. 13B), an excessive pulse will appear at the top of the sampling pulse train as shown by the dashed line in (o) in FIG. 13B and a pulse is missing at the end of the pulse train, resulting in a faulty sampling of video data. On this account, the H blank signal is shifted to have the phase of H blank signal $BL_1$ (shown by (e) in FIG. 13B) when the clock $\Phi_1$ is selected by the selection circuit 32, to have the phase of $BL_2$ (shown by (h) in FIG. 13B) when the clock $\Phi_2$ is selected, to have the phase of $BL_3$ (shown by (j) in FIG. 13B) when the clock $\Phi_3$ is selected, and to have the phase of $BL_4$ (shown by (n) in FIG. 13B) when the clock $\Phi_4$ is selected.

Figure 14:
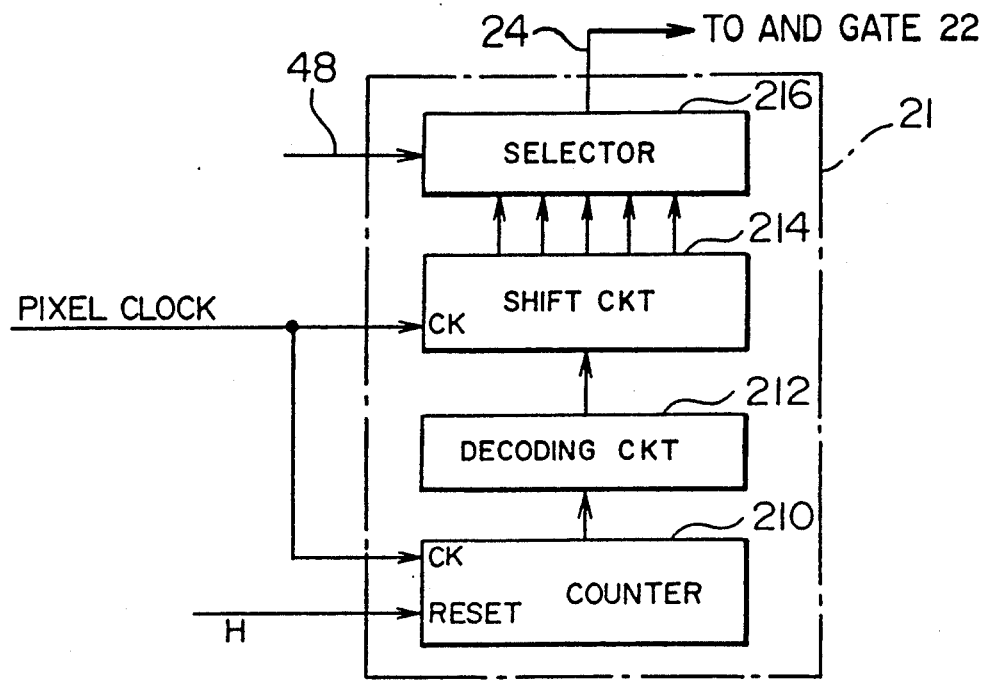
FIG. 14 is a block diagram showing an example of the horizontal blank signal generation circuit.

FIG. 14 shows as an example the arrangement of the H blank signal generation circuit 21 which meets the requirement. The circuit 21 comprises a counter 210, a decoding circuit 212, a shift circuit 214 and a selector 216. The counter 210 which is reset by the horizontal sync signal counts pixel clocks from the VCO 52, and delivers the count value to the decoding circuit 212. The decoding circuit stays low at its output during a period of the counter 210 for contents 0 through 7, for example, and produces a high output for counts above 7. This is the case of the H blank signal $BL_1$ (shown by (e) in FIG. 13B). The shift circuit 214 produces from the output signal of the decoding circuit 212 four H blank signals $BL_1$-$BL_4$ (shown by (e), (h), (j) and (m) in FIG. 13B) having a different period S from each other, and sends the signals to the selector 216. The selector 216 responds to the value (1, 2, 3 or 4) of the signal on the line 48 from the memory control circuit 62 to deliver one of H blank signals $BL_1$-$BL_4$, respectively. In the example shown by (a) of FIG. 13B, the video signal has its horizontal record region starting at the eighth pixel from the head of the H signal. For different cases, the memory control circuit 62 is rendered an offset value in advance, so that the frequency divided clock output from the selection circuit 32 and H blank output from the H blank generation circuit 21 are shifted to attain alignment with the starting position of the video signal record region.

Figure 15:
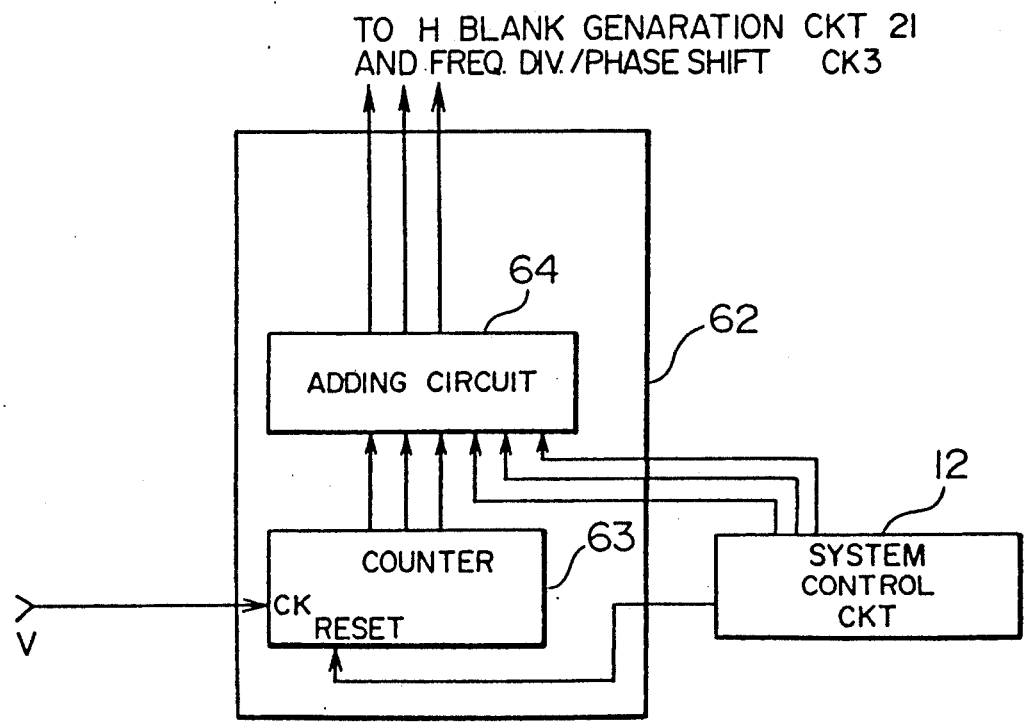
FIG. 15 is a block diagram showing an example of the memory control circuit.

FIG. 15 shows an example the circuit arrangement of the memory control circuit 62. The circuit includes a counter 63 comparable to the counter 61 in FIG. 4, and it is cleared by the freeze trigger and operates to count the vertical sync signal. The count value provided by the counter 63 represents the number of write operations, i.e., the frame number, and it also indicates the write line number in the horizontal direction. Indicated by 64 is an adding circuit which sums the offset value from the system control circuit 12 and the output of the counter 63. In the case of a different horizontal record region of the video signal, the offset value from the system control circuit 12 is altered, so that the adding circuit 64 has its output shifted by the amount of the offset value. Consequently, the sampling pulse is shifted by the number of pixel clocks relevant to the offset value. For example, for an offset value of "3", the clock will be used first as a sampling pulse.

In case the number of pixels included in a horizontal period varies, the frequency division factors of the PLL frequency dividers 53 and 54, which base the reference signal on the horizontal sync signal, are altered using a control signal 47 from the system control circuit 12. The variation in the signal region recorded between vertical sync signals can also be offset by altering the decoded value for the V blank generation circuit 20 using the signal on the line 47 from the system control circuit 12.

Figure 5:
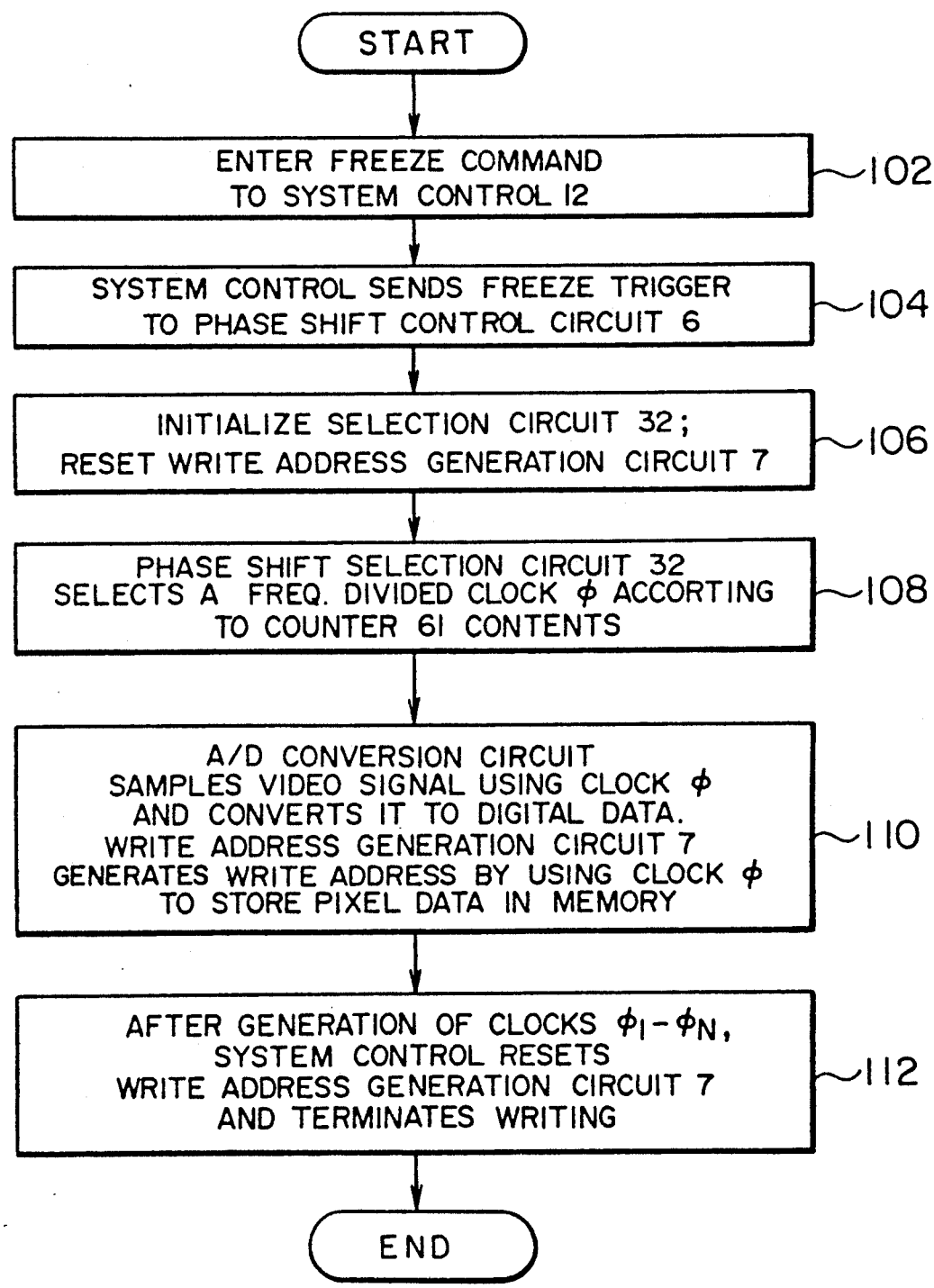
FIG. 5 is a flowchart used to explain the write operation of the video signal to the memory according to the first embodiment of this invention.
Figure 7:
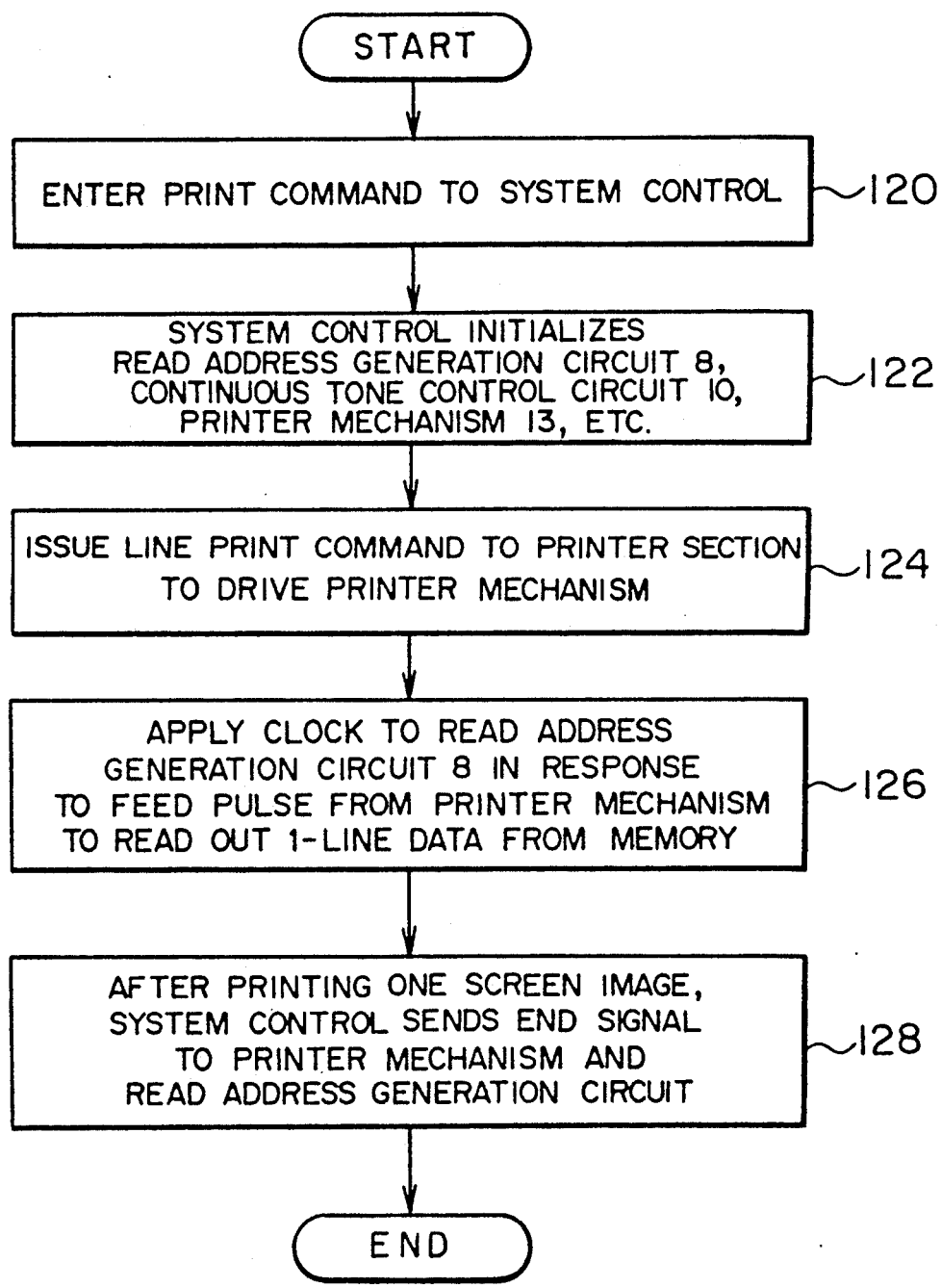
FIG. 7 is a flowchart used to explain the print operation according to the first embodiment of this invention.
Figure 8:
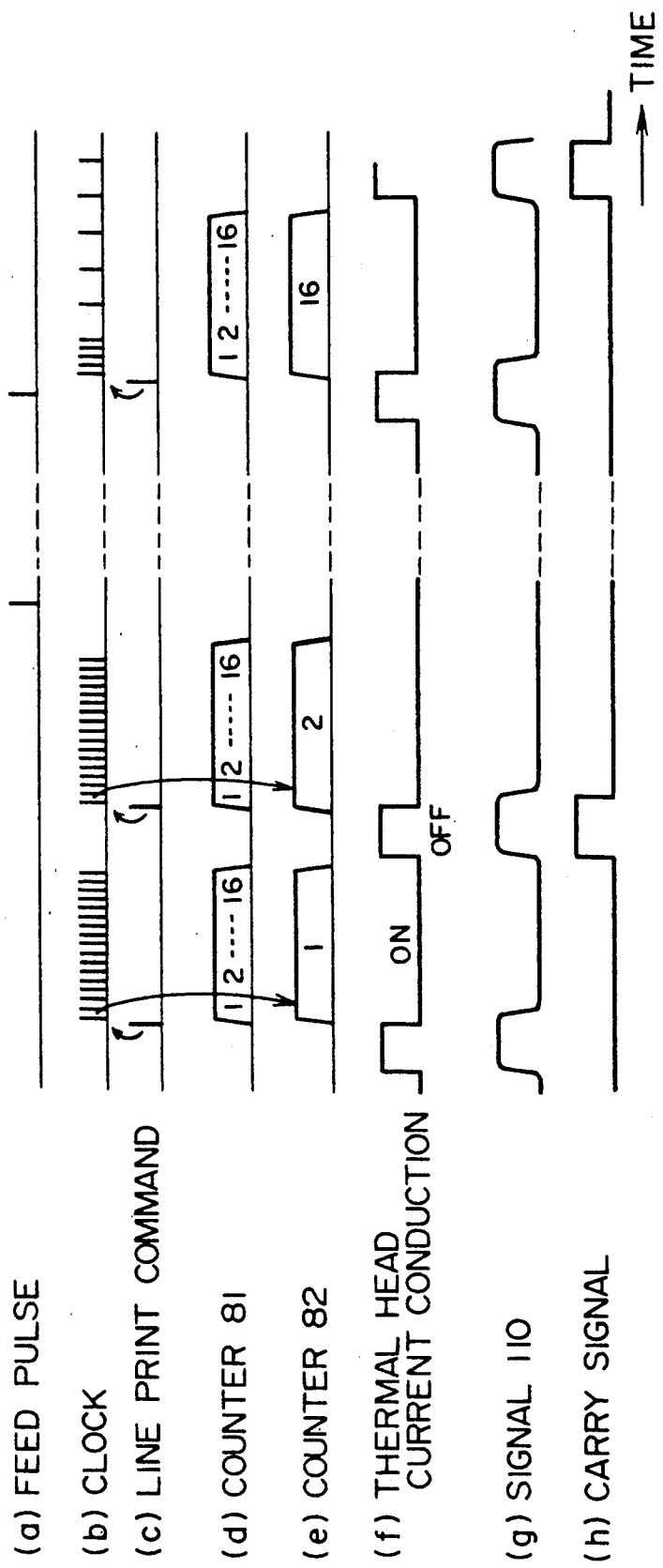
FIG. 8 is a timing chart used to explain the operation of the read address generation circuit according to the first embodiment of this invention.

The operation of this embodiment is virtually identical to the case of the first embodiment shown in the flowcharts of FIGS. 5 and 7, with a minor difference being step 106 which further sets an offset value to the adding circuit 64. As described, this embodiment can deal with a varying video signal record region by altering the offset value using the control signal from the system control circuit 12, so that the signal reading region is aligned to the record region. This embodiment may be modified to limit the recording region only in one of the horizontal and vertical periods, and in this case one of the circuits 20 and 21 is eliminated.

Figure 16:
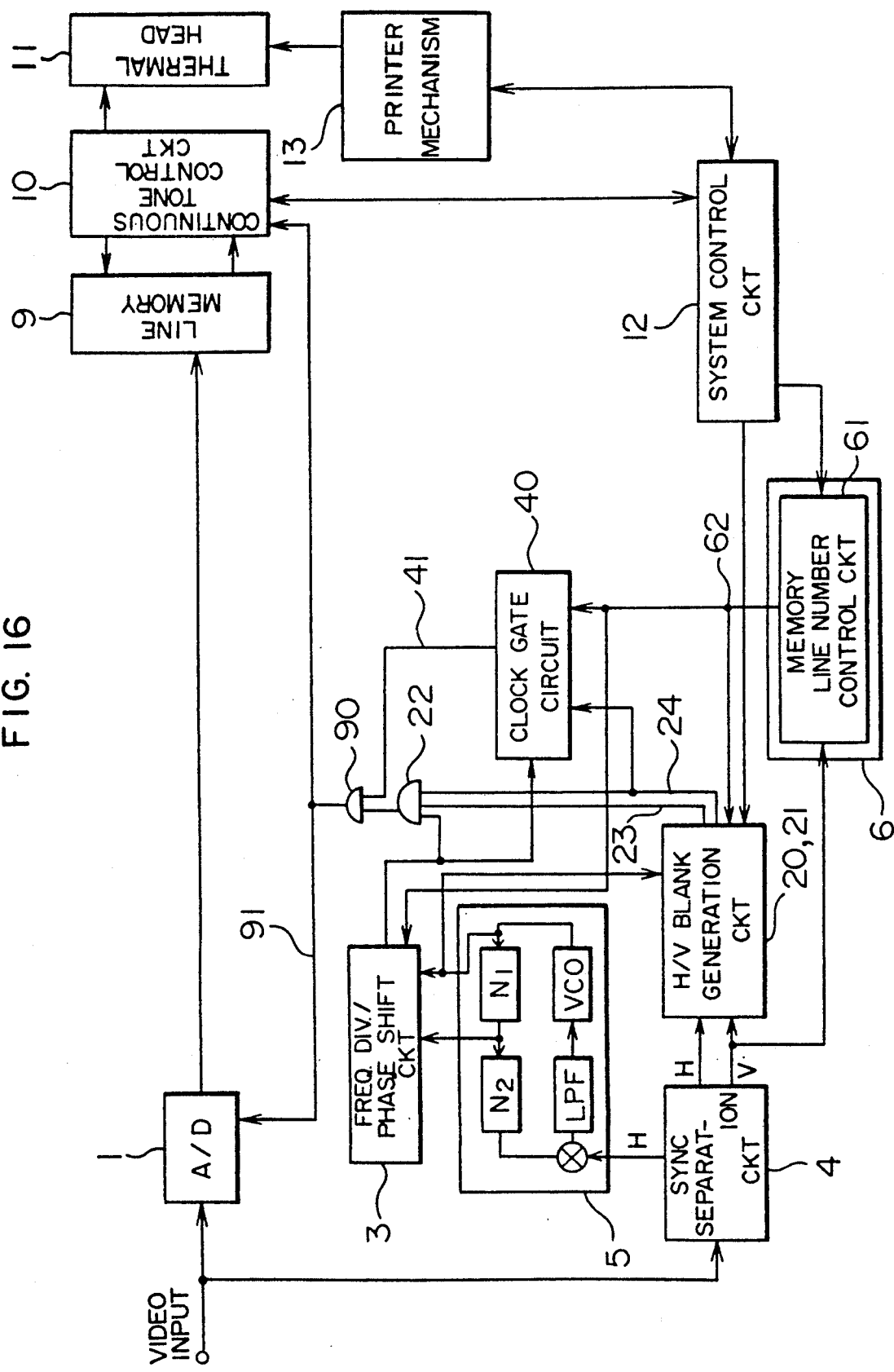
FIG. 16 is a block diagram of the fourth embodiment of this invention.

Next, the fourth embodiment of this invention will be described. FIG. 16 is a block diagram of the fourth embodiment, in which functional blocks identical to those of the first and third embodiments are referred to by the common symbols. This embodiment is intended to store pixel data for one line directly to the line memory, instead of storing pixel data of one screen image in the memory and transferring 1-line pixel data to the line memory. For this operation, this embodiment includes a clock gate circuit 40 and a gate circuit 90, in place of the write address and read address generation circuits 7 and 8 in the third embodiment. The clock gate circuit 40 produces a gate pulse 41 which defines the target sampling phase in accordance with the H blank signal from the H blank generation circuit 21, frequency divided clock pulses and the value from the memory control circuit 61, and the gate circuit 90 delivers one of sampling pulses from the AND gate 22 to the A/D conversion circuit 1 and intermediate tone control circuit 10 selectively in accordance with the gate pulse 41 from the blank gate circuit 40.

Figure 17:
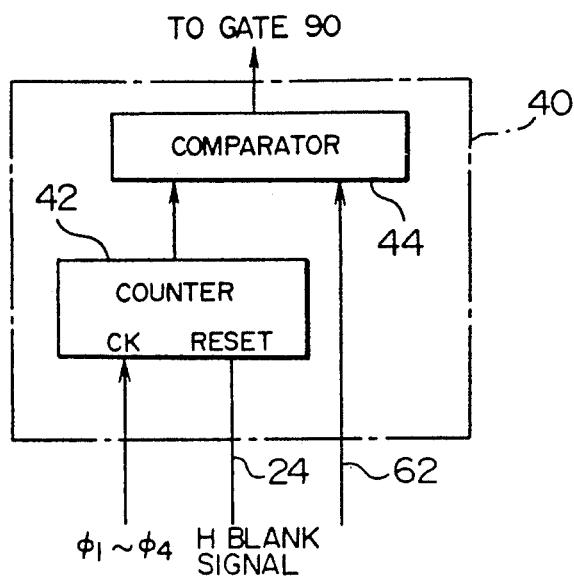
FIG. 17 is a block diagram showing an example of the clock gate circuit.
Figure 18:
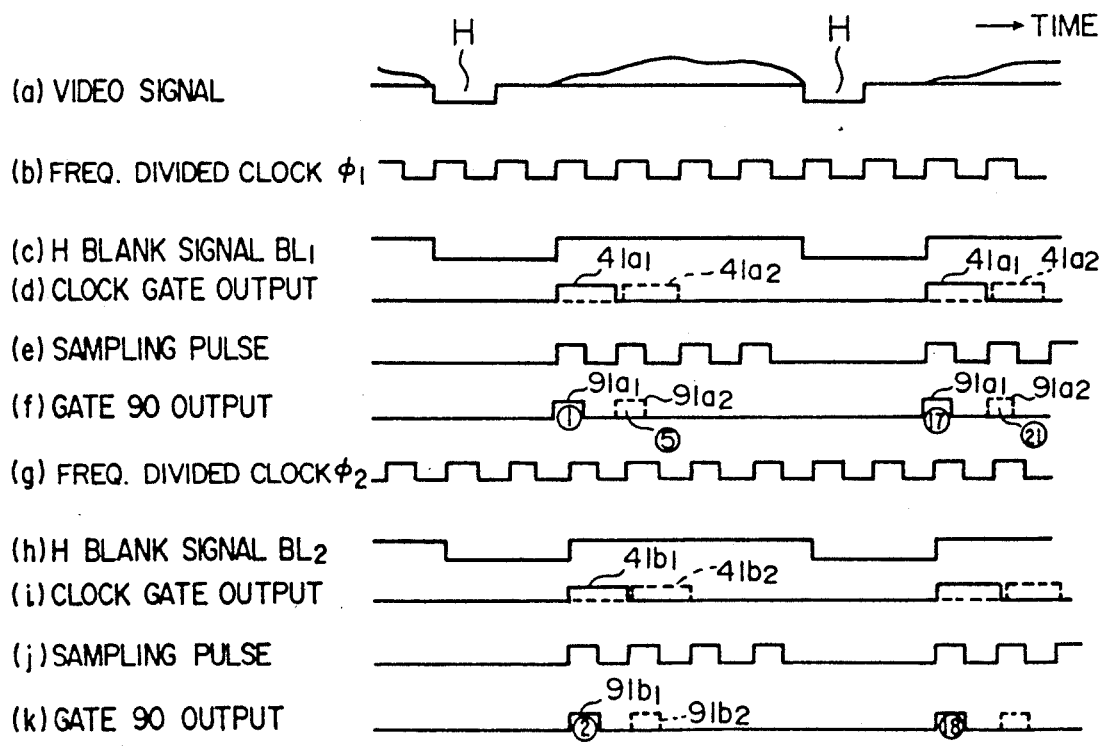
FIG. 18 is a timing chart used explain the operation of the embodiment shown in FIG. 16.

FIG. 17 shows the circuit arrangement of the clock gate circuit 40, and FIG. 18 shows the signal waveforms at the inputs and outputs of the clock gate circuit and AND gate 90. The clock gate circuit 40 comprises a counter 42 which is cleared by the H blank signal and counts the frequency divided clock from the phase shift circuit 3, and a comparator 44 which produces the gate pulse 41 from the count value of the counter 42 and the value of a signal 62 from the memory control circuit 61. The value of the signal 62 from the circuit 61 represents the frame number.

In the foregoing first through fourth embodiments, instead of providing the memory control circuit 6, the function thereof may be included in the system control circuit 12.

Figure 19:
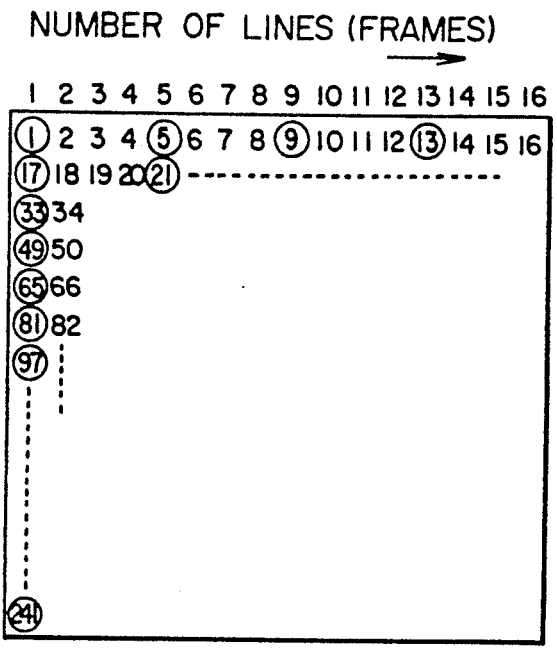
FIG. 19 is a diagram showing the arrangement of pixels on the video screen for explaining the operation of the fourth embodiment.

The operation of the clock gate circuit 40 will be described with reference to the timing chart of FIG. 1 and the image pixel arrangement diagram of FIG. 19. In this embodiment, for the first frame, pixels 1, 17, 33, . . . 241 on the first line are sampled using the frequency divided clock $\Phi_1$ and printed, for the second frame, pixels 2, 18, 34, and so on the second line are sampled using the frequency divided clock $\Phi_2$ and printed, and successively the third and fourth lines are sampled using the frequency divided clocks $\Phi_3$ and $\Phi_4$ and printed, and then the frequency divided clock $\Phi_1$ is used again for sampling the fifth frame for printing. Accordingly, the comparator 44 operates to produce a clock gate pulse 41 for passing the first pulse of the sampling pulse train from the gate 22 when the signal 62 has values (frame numbers) of 1 through 4, for passing the second sampling pulse when the signal has values of 5–8, for passing the third sampling pulse when the signal has values of 9–12, and for passing the fourth sampling pulse when the signal has values of 13–16. For the first time, the comparator 44 produces a clock gate pulse 41a1 (shown by (d) in FIG. 18) which is high only during a period until the counter 42 reaches 2 from 1 for the count value of the demultiplied clock $\Phi_1$, and consequently, the gate 90 passes the first pulse 91a1 for pixels 1, 17 and so on (shown by (f) in FIG. 18) among sampling pulses (shown by (e) in FIG. 18) from the AND gate 22. Similarly, for the second frame, the comparator 44 produces a clock gate pulse 41b1 (shown by (i) in FIG. 18) which is high only during a period until the counter 42 reaches 2 from 1 for the count value of the frequency divided clock $\Phi_2$, and consequently, the gate 90 passes the first pulse 91b1 for pixels 2, 18 and so on (shown by (k) in FIG. 18) among sampling pulses (sown by (j) in FIG. 18). For the fifth frame, the comparator 44 products a clock gate pulse 41a2 which is high only during a period until the counter 42 reaches 3 from 2 for the count value of the frequency divided clock $\Phi_1$, and the gate 90 passes the second pulse 91a2 for pixels 5, 21 and so on (shown by (f) in FIG. 18) among sampling pulses (shown by (e) in FIG. 18).

In this manner, sampling clocks 91 for each frame from the gate 90 are delivered to the A/D conversion circuit 1 and intermediate tone control circuit 10, and video data for one line produced by the sampling clocks 91 are stored sequentially in the line memory 9. Subsequently, the system control circuit 12 and continuous tone control circuit 10 operate in unison to produce signals for driving the thermal head 11, and 1-line image data is printed. The use of two gates 40 and 90 allows the clock gate circuit to operate slower. Consequently, the shift register for phase-shift is the only section required to operate at the speed of the VOC in the PLL oscillator, and the circuit can be configured using usual TTL components.

Figure 20:
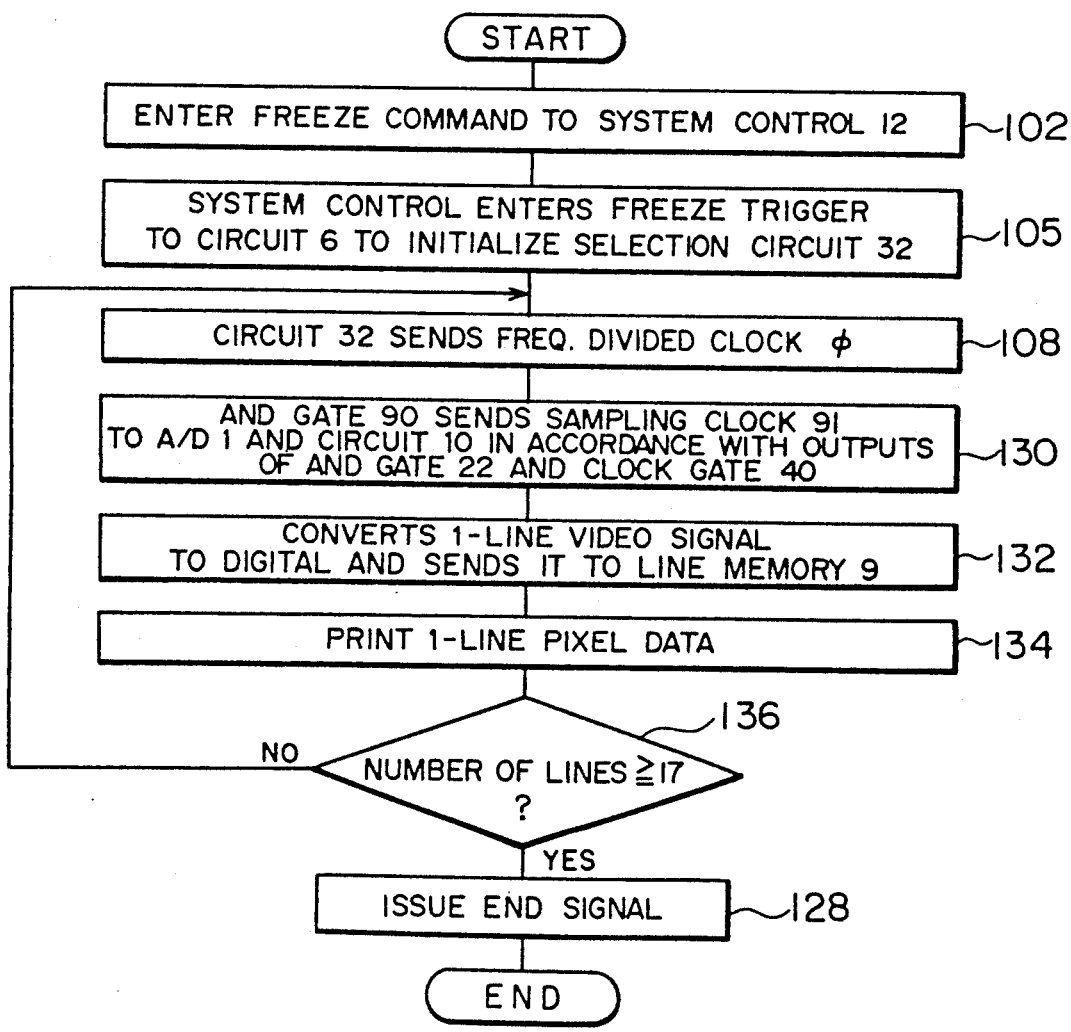
FIG. 20 is a flowchart showing the operation of the fourth embodiment.

FIG. 20 shows in flowchart the operation of this embodiment. Initially, a freeze command is issued to the system control circuit 12 (step 102), and it applies a freeze trigger to the phase shift control circuit 6 to initialize the selection circuit 32 (step 105). The circuit 32 provides a frequency divided clock $\Phi_1$–$\Phi_4$ selectively depending on the value of signal 62 (step 108), and the AND gate 90 delivers the sampling clock 91 to the A/D conversion circuit 1 and intermediate tone control circuit 10 in accordance with the outputs of the AND gate 22 and clock gate 40 (step 130). The A/D conversion circuit 1 responds to the clock 91 to sample pixel signal for one line and sends the pixel data to the line memory 9 (step 132), and the data is printed (step 134). The steps 108–134 are repeated until the number of lines counted by the circuit 61 reaches 16, and at the next count 17 when pixel data for a complete screen image have been printed, the system control circuit 12 issues the end signal (step 128).

Although in this embodiment the range of sampling has not been mentioned, the sampling position can be altered by providing an offset value for the signal 62 indicative of the number of print lines produced by the memory control circuit 61, as in the third embodiment. This embodiment is capable of producing a print of an input video signal without the provision of a memory for the entire screen area. The clock generation circuit has little circuit sections that are required to operate fast, as compared with the conventional circuit arrangement. Although this embodiment supplies pixels for one line in the vertical direction to the line printer, it may be modified to deliver pixels for one horizontal line.

The third and fourth embodiments can be modified, as in the case of the second embodiment, to sample, A-D convert and print multi-color images.

Although the foregoing embodiments have been explained for a screen image by 16-by-16 pixels with the intention of simplicity, they can readily be applied in the similar circuit arrangement to a high-resolution display having a 1280-by-1024 pixel configuration for example. Although the embodiments have been explained for the case of a 1-frame screen, they can readily be applied to cases of multiple-frame screen. For example, in the case of a n-frame screen, they are modified to use the sampling pulses $\Phi_1$-$\Phi_4$ n times repeatedly for the sampling and successive operations.

This invention is designed to sample a video signal at an internal of multiple pixels, and consequently it does not require the A/D converter and memory to operate fast for sampling a video signal of a high-resolution display. Only the phase sampling shift register is required to operate at the same speed as of the PLL circuit, and any special circuit element need to be used. In addition, by setting a video signal recording region for sampling, only a desired section of the screen can be printed.

We claim:

1. A video signal process controller for a video printer having sampling means for sampling a video signal, analog-to-digital conversion means for converting the sampled video signal into a digital signal, memory means for storing the converted digital signal, and printer means for reading out contents of said memory means and for recording the contents on a recording medium, said controller comprising:

extraction means for extracting a horizontal sync signal and a vertical sync signal from the video signal;

oscillation means for oscillating in synchronism with the extracted horizontal sync signal in order to generate a pixel clock signal having a pixel clock signal frequency;

frequency division means for dividing the frequency of the pixel clock signal generated by the oscillation means to produce a frequency divided clock signal;

phase shift means which produces, by shifting the frequency divided clock signal in accordance with the pixel clock signal, multiple types of frequency divided clock signals out of phase from each other by 1-pixel clock signal period;

selection means for selecting one of the multiple types of frequency divided clock signals from said phase shift means as a sampling pulse signal in response to which the video signal is sampled by the sampling means; and selection control means for operating on said selection means in order to sequentially select a different type of frequency divided clock signal in response to the vertical-sync signal from said extraction means.

2. A video signal process controller according to claim 1, wherein said frequency division means divides the pixel clock signal frequency by 1/N, where N is an integer greater than one, said phase shift means generates N kinds of frequency divided clock signals, and said selection control means operates on said selection means to sequentially select one of N types of frequency divided clock signals in response to the vertical sync signal, so that pixel data for one picture in the video signal is sampled by the sampling means.

3. A video signal process controller according to claim 1 or 2, wherein said memory means comprises a first memory which receives the converted digital signal to store pixel data of the video signal for the one picture, and a second memory which stores the digital signal for a portion of the picture read out of said first memory, and wherein said video signal process controller further comprises:

write address generation means which generates a write address for storing the digital signal from said conversion means into said first memory in response to the sampling pulse signal from the selection means and delivers the write address to said first memory;

means for generating a read clock signal; and read address generation means which generates a read address for reading out the digital signal from said first memory and delivers the read address to said second memory, said printer means reading out the digital signal from said second memory each time the digital signal has been stored in said second memory and recording the digital signal on the recording medium.

4. A video signal process controller according to claim 3, wherein said write address generation means generates, as the write address, stepping addresses at an N address interval in response to the sampling pulse signal, and said read address generation means generates, as the read address, continuous addresses in response to a read clock signal.

5. A video signal process controller according to claim 3, wherein said write address generation means generates, as the write address, continuous addresses in response to the sampling pulse signal, and said read address generation means generates, as the read address, stepping addresses at an N address interval in response to a read clock signal.

6. A video signal process controller according to claim 3, further comprising counting means for counting the vertical sync signal and means for halting the generation of the write address by said write address generation means when a count value of said counting means reaches a count of N+1.

7. A video signal processing controller according to claim 1, wherein said memory means receives the converted digital signal in order to store a portion of a picture in the video signal, and wherein said video signal process controller further comprises gate means which selectively passes one of multiple sampling pulses selected by said selection means to the sampling means, and means for controlling said gate means in order to sequentially switch the selection of a sampling pulse by said selection means in response to the vertical sync signal, and wherein the digital signal from said memory means is read out and recorded on the recording medium by the printer means each time the digital signal has been stored in said memory means.

8. A video signal process controller according to claim 1, further comprising first signal generation means for generating a first signal indicative of a recording segment of the video signal and gate means for passing the sampling pulse signal from said selection means to the sampling means only for the recording segment indicated by the first signal.

9. A video signal process controller according to claim 8, wherein said first signal indicates a recording segment of the video signal within a horizontal period.

10. A video signal process controller according to claim 9, further comprising means for controlling said first signal generation means so that the first signal is shifted in phase by 1-pixel clock period sequentially in response to each of a plurality of vertical sync signals.

11. A video signal process controller according to claim, 9 further comprising means of for controlling said first signal generation means so that the first signal is controlled in phase in accordance with an intended recording segment.

12. A video signal process controller according to claim 8, wherein the first signal indicates a recording segment of the video signal within a vertical period.

13. A video signal process controller according to claim 1, further comprising:
   first signal generation means for generating a first signal indicative of a recording segment of the video signal within a horizontal period;
   second signal generation means for generating a second signal indicative of a recording segment of the video signal within a vertical period; and
   gate means for passing the sampling pulse signal from said selection means to the sampling means only for a segment in which segments indicated by said first and second signals overlap.

14. A video signal process control method for a video printer having sampling means for sampling a video signal, analog-to-digital conversion means for converting the sampled video signal into a digital signal, memory means for storing the converted digital signal, and printer means for reading out contents of said memory and for recording the contents on a recording medium, said method comprising the steps of:
   extracting a horizontal sync signal and a vertical sync signal from the video signal;
   oscillating in synchronism with the extracted horizontal sync signal in order to generate a pixel clock signal having a pixel clock signal frequency;
   dividing the frequency of the pixel clock signal in order to produce a frequency divided clock signal;
   producing, by shifting the frequency divided clock signal in accordance with the pixel clock signal, multiple types of frequency divided clock signals out of phase from each other by 1-pixel clock signal period;
   selecting one of the multiple types of frequency divided clock signals sequentially as a sampling pulse signal; and
   sequentially selecting a different type of frequency divided clock signal in response to the vertical sync signal, the video signal being sampled by said sampling means in response to the sampling pulse signal.

15. A video signal process control method according to claim 14, wherein the frequency divided clock signal is produced by dividing the pixel clock signal frequency by 1/N, where N is an integer greater than 1, and said multiple types of frequency divided clock signals include four types of frequency divided clock signals.

16. A video signal process control method according to claim 14 or 15, wherein said memory means comprises a first memory which receives the converted digital signal in order to store pixel data of the video signal for one picture, and a second memory which stores the digital signal for a portion of the picture read out of said first memory, and wherein said video signal process control method further comprises the steps of:
   generating a write address for storing the digital signal from said conversion means into said first memory in response to the sampling pulse signal and delivering the write address to said first memory; and
   generating a read address for reading out the digital signal from said first memory and delivering the read address to said second memory;
   wherein said printer means reads out the digital signal from said second memory each time the digital signal has been stored in said second memory and records the digital signal on the recording medium.

17. A video signal process control method according to claim 14, wherein said memory means receives the converted digital signal in order to store part of a picture in the video signal, and wherein the video signal process control method further comprises the steps of:
   selectively passing one of multiple sampling pulse output from selection means for selecting one of the multiple types of frequency divided clock signals as the sampling pulse signal to said sampling means; and
   controlling a gate to sequentially switch selection of a sampling pulse signal in response to the vertical sync signal; wherein said printer means reads out the digital signal from said memory means and records the digital signal on the recording medium each time the digital signal has been stored in said memory means.

18. A video signal process control method according to claim 14, further comprising the steps of:
   generating a first signal indicative of a recording segment of the video signal; and
   passing the sampling pulse signal from selection means for selecting one of the multiple types of frequency divided clock signals as the sampling pulse signal to said sampling means only for the segment indicated by the first signal.

19. A video signal process control method according to claim 14, further comprising the steps of:
   generating a first signal indicative of a recording segment of the video signal within a horizontal period;
   generating a second signal indicative of a recording segment of the video signal within a vertical period; and
   passing the sampling pulse signal to said sampling means only for a segment in which segments indicated by said first and second signals overlap.

20. A video printer comprising:
   sampling means for sampling a video signal in response to a sampling pulse signal;
   analog-to-digital conversion means for converting the sampled video signal into a digital signal;
   memory means for storing the converted digital signal;
   printer means for reading out contents of said memory means and for recording the contents on a recording medium;
   extraction means for extracting a horizontal sync signal and a vertical sync signal from the video signal;
   oscillation means for oscillating in synchronism with the extracted horizontal sync signal in order to generate a pixel clock signal having a pixel clock signal frequency;
   frequency division means for dividing the frequency of the pixel clock signal generated by the oscillation means to produce a frequency divided clock signal;
   phase shift means which produces, by shifting the frequency divided clock signal in accordance with the pixel clock signal, multiple types of frequency divided clock signals out of phase from each other by 1-pixel clock signal period;
   selection means for selecting one of the multiple types of frequency divided clock signals from said phase shift means as the sampling pulse signal in response to which the video signal is sampled by the sampling means; and selection control means for operating on said selection means in order to sequentially select a different type of frequency divided clock signal in response to the vertical sync signal from said extraction means.

21. A video printer according to claim 20, wherein said frequency division means divides the pixel clock signal frequency by 1/N, where N is an integer greater than one, said phase shift means generates N kinds of frequency divided clock signals, and said selection control means operates on said selection means to sequentially select one of N types of frequency divided clock signals in response to the vertical sync signal, so that pixel data for one picture in the video signal is sampled by the sampling means.

22. A video printer according to claim 21, wherein said memory means comprises a first memory which receives the converted digital signal to store pixel data of the video signal for the one picture, and a second memory which stores the digital signal for a portion of the picture read out of said first memory, and wherein said video signal process controller further comprises:

write address generation means which generates a write address for storing the digital signal from said conversion means into said first memory in response to the sampling pulse signal from the selection means and delivers the write address to said first memory;

means for generating a read clock signal; and read address generation means which generates a read address for reading out the digital signal from said first memory and delivers the read address to said second memory, said printer means reading out the digital signal from said second memory each time the digital signal has been stored in said second memory and recording the digital signal on the recording medium.

* * * * *